US009762765B2

(12) United States Patent
Ito

(10) Patent No.: US 9,762,765 B2
(45) Date of Patent: Sep. 12, 2017

(54) IMAGE FORMING APPARATUS WHEREIN CLOCK FREQUENCY IS DETERMINED BY PROCESSING LOAD

(71) Applicant: KONICA MINOLTA, INC., Chiyoda-ku (JP)

(72) Inventor: Takayuki Ito, Toyokawa (KR)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 44 days.

(21) Appl. No.: 14/462,687

(22) Filed: Aug. 19, 2014

(65) Prior Publication Data
US 2015/0055160 A1 Feb. 26, 2015

(30) Foreign Application Priority Data

Aug. 20, 2013 (JP) ................................. 2013-170131

(51) Int. Cl.
*G06F 3/12* (2006.01)
*H04N 1/00* (2006.01)

(52) U.S. Cl.
CPC . *H04N 1/00933* (2013.01); *H04N 2201/0094* (2013.01)

(58) Field of Classification Search
CPC .... G03G 15/50; G03G 15/5004; G03G 15/80; H04N 1/00888; H04N 1/00933;
(Continued)

(56) References Cited

U.S. PATENT DOCUMENTS 6,226,471 B1* 5/2001 Tsuzuki ................ G03G 15/50
399/43
6,282,387 B1* 8/2001 Yamada ................ G03G 15/50
399/43
(Continued)

FOREIGN PATENT DOCUMENTS

JP H01-177559 A 7/1989
JP H07-081186 A 3/1995
(Continued)

OTHER PUBLICATIONS

Office Action (Notification of Reasons for Refusal) issued on Jun. 30, 2015, by the Japanese Patent Office in corresponding Japanese Patent Application No. 2013-170131, and an English Translation of the Office Action. (4 pages).

*Primary Examiner* — Mohammad Ghayour
*Assistant Examiner* — Jonathan R Beckley
(74) *Attorney, Agent, or Firm* — Buchanan Ingersoll & Rooney PC

(57) ABSTRACT

An image forming apparatus has a clock supply circuit supplying a signal at a first clock frequency or a second clock frequency lower than the first frequency, a first CPU performing image data processing based on the signal, and a second CPU measuring time based on the signal to determine execution timing of each process performed in control processing. The image forming apparatus includes a load determination unit determining whether a load of the image data processing is higher than a reference level, and a control unit that switches the frequency to the first frequency when the load is higher than the reference level, and to the second frequency when the load is not higher. When the frequency switching occurs, the second CPU changes a method for measuring time. The second CPU completes one
(Continued)

process before the switching and starts the next one after the switching.

11 Claims, 15 Drawing Sheets

(58) Field of Classification Search
CPC ............ H04N 1/295; H04N 1/00855; H04N 1/00912; H04N 1/00931; H04N 1/00954; H04N 1/0096; H04N 1/2307; H04N 1/00904; H04N 1/00952; G06F 1/3203; G06F 1/324; G06F 1/3253; G06F 1/3284; G06F 1/3296; B41J 29/38; B41J 2/04541; B41J 2/04548; B41J 2/0457; H02P 8/22
USPC ...... 358/1.12–1.15, 305, 1.9, 410, 412, 413; 713/340, 330, 322, 375, 400, 401, 500, 713/501, 502, 600; 345/519, 502, 522; 347/249, 144
See application file for complete search history.

(56) References Cited

U.S. PATENT DOCUMENTS

| | | | | |
|---|---|---|---|---|
| 6,612,672 | B2 * | 9/2003 | Yasuda | B41J 2/04541 347/12 |
| 6,719,396 | B2 * | 4/2004 | Anzai | H02P 29/02 347/14 |
| 7,000,140 | B2 * | 2/2006 | Okubo | G06F 1/3203 713/324 |
| 7,295,786 | B2 * | 11/2007 | Brinsley | G03G 15/5004 399/16 |
| 7,441,853 | B2 * | 10/2008 | Takata | B41J 2/0457 347/10 |
| 7,567,264 | B2 * | 7/2009 | Izumiya | 347/116 |
| 7,886,170 | B2 * | 2/2011 | Komatsu | B41J 29/38 713/310 |
| 7,940,421 | B2 * | 5/2011 | Takaki | 358/1.9 |
| 8,272,640 | B2 * | 9/2012 | Yamamoto | B41J 13/0009 271/265.01 |
| 8,299,745 | B2 * | 10/2012 | Tsuchiya | B41J 29/38 318/504 |
| 8,305,656 | B2 * | 11/2012 | Hayashi | H04N 1/32561 358/468 |
| 8,498,011 | B2 * | 7/2013 | Takahashi | G03G 15/5004 358/1.15 |
| 8,503,013 | B2 * | 8/2013 | Seki | G03G 15/50 358/1.13 |
| 8,526,023 | B2 * | 9/2013 | Tachikawa | 358/1.13 |
| 8,537,431 | B2 * | 9/2013 | Oyama | B41J 2/45 347/129 |
| 8,814,303 | B2 * | 8/2014 | Mano | B41J 2/125 347/14 |
| 8,948,642 | B2 * | 2/2015 | Kosaka | G03G 15/80 399/81 |
| 2007/0260753 | A1 | 11/2007 | Komatsu et al. | |
| 2008/0304850 | A1 * | 12/2008 | Groninger | B41J 29/393 399/88 |
| 2009/0083559 | A1 | 3/2009 | Matsumoto | |
| 2011/0249069 | A1 * | 10/2011 | Oyama | B41J 2/45 347/129 |
| 2011/0310413 | A1 * | 12/2011 | Nakao | G03G 15/5004 358/1.9 |
| 2013/0045023 | A1 * | 2/2013 | Kosaka | G03G 15/80 399/88 |

FOREIGN PATENT DOCUMENTS

| | | |
|---|---|---|
| JP | 9-146896 A | 6/1997 |
| JP | 2006-239968 A | 9/2006 |
| JP | 2006-289917 A | 10/2006 |
| JP | 2007-47966 A | 2/2007 |
| JP | 2007-290258 A | 11/2007 |
| JP | 2009-75973 A | 4/2009 |
| JP | 2009-218809 A | 9/2009 |

* cited by examiner

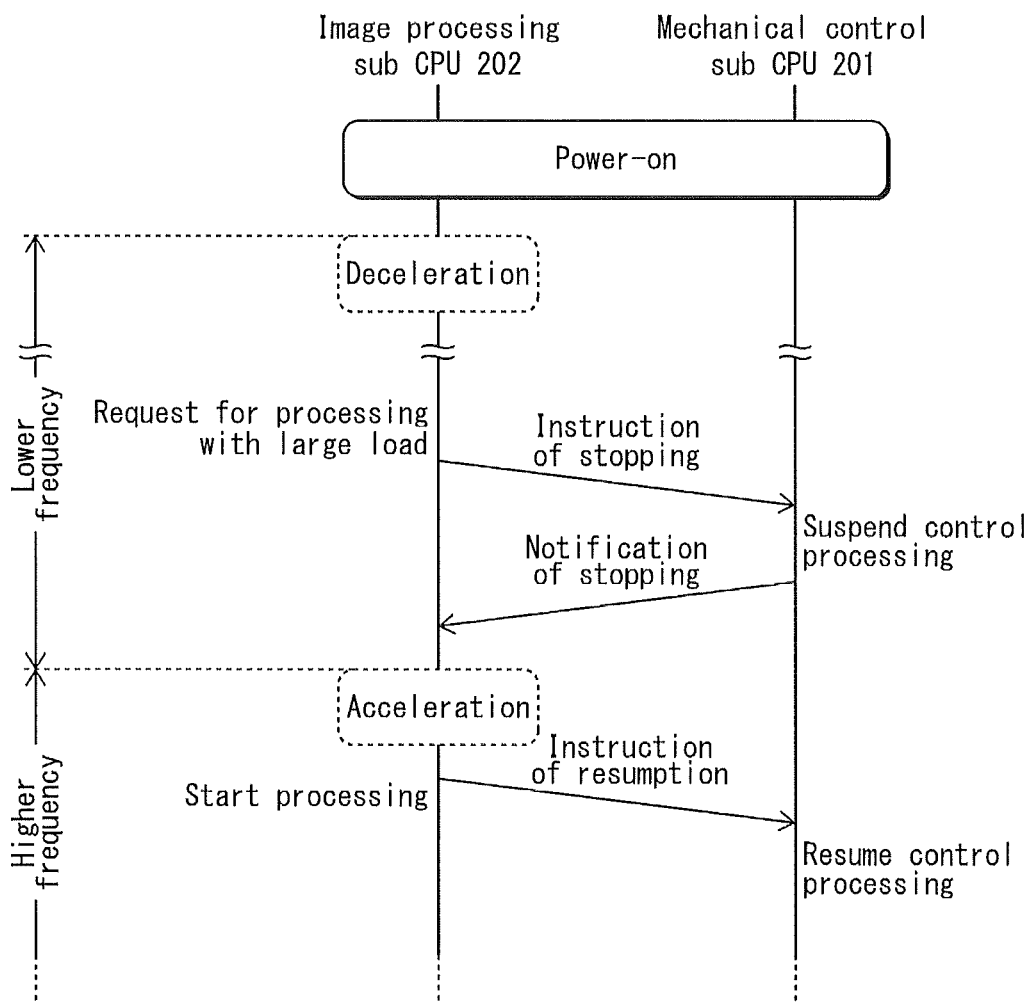

IMAGE FORMING APPARATUS WHEREIN CLOCK FREQUENCY IS DETERMINED BY PROCESSING LOAD

CROSS-REFERENCE TO RELATED APPLICATIONS

This application is based on an application No. 2013-170131 filed in Japan, the contents of which are hereby incorporated by reference.

BACKGROUND OF THE INVENTION (1) Field of the Invention

The present invention relates to an image forming apparatus, and in particular to a technology for simultaneously achieving high-speed processing and power saving by switching a clock frequency in a manner to prevent malfunction.

(2) Related Art

In recent years, an image forming apparatus is generally provided with a plurality of CPUs (Central Processing Units) for digitally controlling the components thereof. Furthermore, in order to meet the need for reducing the size of an image forming apparatus, the SoC (System on a Chip) is considered as a possible means for high-density packaging of a plurality of CPUs on a circuit substrate. When the SoC is employed, the increase in the scale of the integrated circuit causes degradation in yield, for example, which results in the increase in cost. In order to suppress the increase in cost by reducing the scale of the integrated circuit, peripheral circuits can be shared among the CPUs.

For example, instead of providing a dedicated clock supply circuit for each of the plurality of CPUs, the CPUs may use a single clock supply circuit in common. This reduces the number of clock supply circuits, and accordingly reduces the scale of the integrated circuit. Such a method is advantageous for, in particular, image forming apparatuses in a low price range such as SFPs (Single Function Peripherals) and AIO (All in One) printers, for which cost saving is strongly required.

In general, a digital circuit consumes less power when the clock frequency thereof is low, while the processing speed thereof is increased when the clock frequency is increased. With respect to an image forming apparatus, mechanical control processing can be performed at a low clock frequency because the processing load thereof is small. In contrast, image processing in color and other processing are preferably performed at a high clock frequency because the processing load thereof is large.

When a single clock supply circuit is shared between a CPU performing mechanical control (hereinafter, referred to as "mechanical control sub CPU") and a CPU performing image processing (hereinafter, referred to as "image processing sub CPU"), the clock frequency of the clock supply circuit is switched between a higher clock frequency and a lower one. Specifically, the higher clock frequency is used during the image processing is performed, and the lower clock frequency is used while the image processing is not performed. This allows for both acceleration of the image processing and reduction in power consumed for the mechanical control processing.

However, in some cases, the mechanical control sub CPU counts clocks for determining timing in, for example, control processing of a position of a recording sheet. If this is the case, a problem may occur that the timing cannot be determined correctly if the clock frequency is changed while the mechanical control sub CPU is counting clocks. To avoid this problem, and also to accelerate the image processing, it is possible to perform the mechanical control also at a high clock frequency. However, in this case, power consumption cannot be saved.

SUMMARY OF THE INVENTION

In consideration of the problem described above, the present invention aims to provide an image forming apparatus that achieves power saving by changing a clock frequency in a manner that the mechanical control processing is not negatively affected.

In order to achieve the above aim, one aspect of the present invention is an image forming apparatus having a system on a chip (SoC) on which a clock supply circuit, a first CPU, and a second CPU are integrated, the clock supply circuit supplying a clock signal while switching a frequency of the clock signal between a first clock frequency and a second clock frequency that is lower than the first clock frequency, the first CPU performing image data processing in synchronization with the clock signal supplied by the clock supply circuit, and the second CPU measuring time with reference to the clock signal supplied by the clock supply circuit and determining, based on the measured time, execution timing of each of a series of processes performed in control processing other than the image data processing, the image forming apparatus comprising: a load determination unit that determines whether a processing load of the image data processing to be performed by the first CPU is higher than a reference level; and a control unit that controls the clock supply circuit to switch the frequency of the clock signal to the first clock frequency when the load determination unit determines that the processing load is higher than the reference level, and to switch the frequency of the clock signal to the second clock frequency when the load determination unit determines that the processing load is equal to or lower than the reference level, wherein when the clock supply circuit performs the switching between the first frequency and the second frequency, the second CPU changes a method for measuring time, thereby avoiding variation in the execution timing, and the second CPU completes one process among the series of processes before the switching of the frequency and starts the next one of the series of processes after the switching of the frequency.

BRIEF DESCRIPTION OF DRAWINGS

These and the other objects, advantages and features of the invention will become apparent from the following description thereof taken in conjunction with the accompanying drawings which illustrate a specific embodiment of the invention. In the drawings:

FIG. 15 is a sequence diagram showing a clock frequency switching operation by the controller 100 according to still another modification of the present invention.

DESCRIPTION OF THE PREFERRED EMBODIMENTS

Embodiments of the image forming apparatus pertaining to the present invention are described below with reference to the drawings.

(1) EMBODIMENT 1

The following describes Embodiment 1 of the present invention. The image forming apparatus pertaining to the present embodiment includes one clock supply circuit shared between a first CPU performing image processing and a second CPU performing mechanical control, and is characterized by the operations performed when the clock frequency is changed during transportation of a recording sheet.

(1-1) Structure of Image Forming Apparatus

The following describes the structure of the image forming apparatus pertaining to the present embodiment.

The image forming apparatus pertaining to the present embodiment is a tandem type color printer apparatus, which receives a printing job from an external device (not shown) via a communication network such as a LAN (Local Area Network) and forms a color image according to the printing job.

Figure 1:
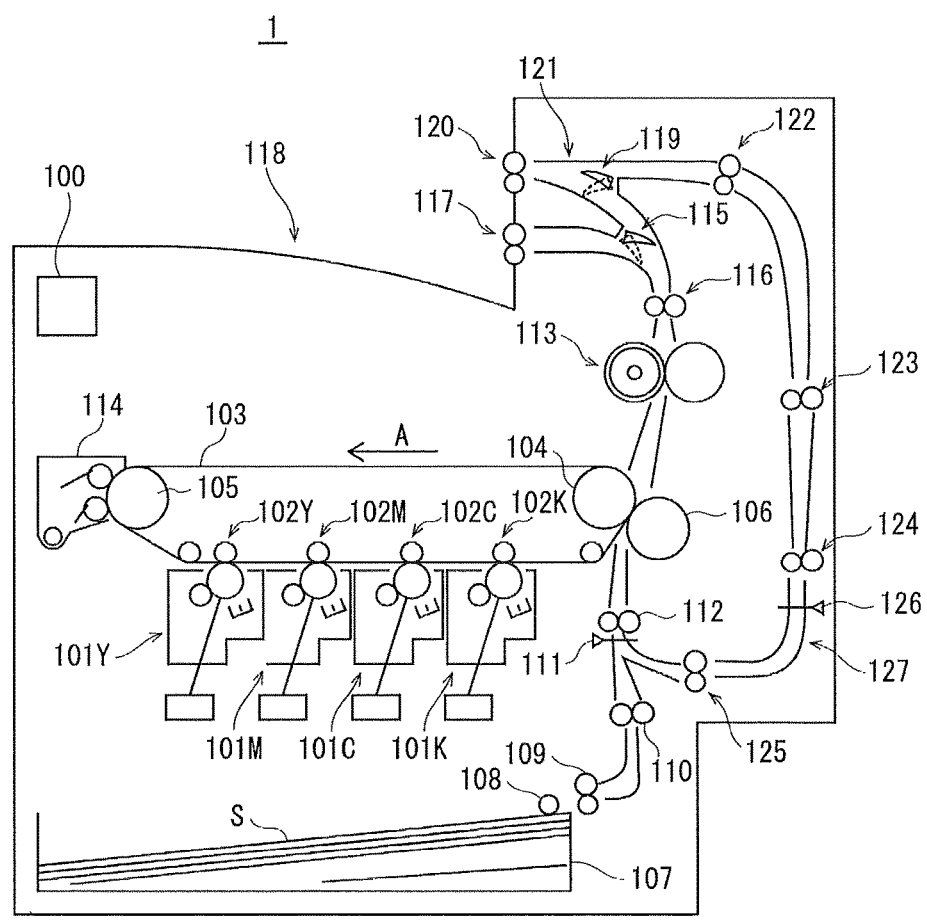
FIG. 1 shows major components of an image forming apparatus according to Embodiment 1 of the present invention.

FIG. 1 shows the major components of the image forming apparatus pertaining to the present embodiment. A controller 100 included in the image forming apparatus 1 converts the image data included in the printing job received from the external device into image data of yellow (Y), magenta (M), cyan (C), and black (B). Image forming units 101Y, 101M, 101C, and 101K each include a photosensitive drum, and a set of a charging device, an exposing device, a developing device, and a cleaning device disposed around the outer circumference surface of the photosensitive drum in this order.

Under the control of the controller 100, the charging device uniformly charges the outer circumference surface of the photosensitive drum, the exposing device performs image exposure on the outer circumference surface of the photosensitive drum to form an electrostatic latent image, and, finally, the developing device develops the electrostatic latent image by supplying toner. In this way, toner images in Y, M, C, and K are formed.

The toner images in Y, M, C, and K are electrostatically attracted to the primary transfer rollers 102Y, 102M, 102C, and 102K, respectively, and, subsequently, superposed on an intermediate transfer belt 103 to form a color toner image (primary transfer). Residual toner remaining on the outer circumference surface of the photosensitive drum after the completion of the primary transfer is scraped by a cleaning blade included in the cleaning device. Subsequently, a discharging lamp discharges the photosensitive drum by exposure.

The intermediate transfer belt 103 is an endless belt which is suspended by a driving roller 104, a driven roller 105, the primary transfer rollers 102Y, 102M, 102C, and 102K, and so on. The intermediate transfer belt 103 is driven by the driving roller 104 to rotate in the direction indicated by an arrow A. This rotation transports the toner image to a secondary transfer nip formed between the driving roller 104 and a secondary transfer roller 106 pressed against the driving roller 104.

The sheet feed cassette 107 houses therein recording sheets S. The recording sheets S are picked up by a pickup roller 108 one by one. The picked-up recording sheet S is transported to a pair of timing rollers 112 by a pair of transport rollers 109 and 110. A timing sensor 111 detects the leading edge of the recording sheet S before it reaches the pair of timing rollers 112. The pair of timing rollers 112 transport the recording sheet S to the secondary transfer nip in accordance with the timing of the secondary transfer.

The toner image on the intermediate transfer belt 103 is electrostatically transferred to the recording sheet S at the secondary transfer nip (secondary transfer). Subsequently, the toner image is thermally fixed on the recording sheet S by a fixing device 113. The toner remaining on the intermediate transfer belt 103 after the secondary transfer is transported further in the direction indicated by the arrow A, and removed by the cleaner 114.

The operation subsequent to the removal of the toner varies depending on whether the printing job requests single-side printing or both-side printing.

When the single-side printing is requested, a switching claw 115 swings to assume the position as depicted in a solid line. Consequently, the recording sheet S is guided toward the pair of sheet ejection rollers 117 by the preliminary sheet ejection rollers 116. The pair of sheet ejection rollers 117 eject the recording sheet S onto a sheet ejection tray 118. Hereinafter, the position of the recording sheet at this timing is referred to as an "ejection completion point". When it is described that a recording sheet is at the ejection completion point, it means that the ejected recording sheet is on the sheet ejection tray 118.

The switching claw 115 swings upward or downward about a fulcrum to assume the position as depicted in a solid line or a broken line. The switching claw 115 swings due to driving of an actuator controlled by the controller 100. A motor, solenoid, or the like may be used as the actuator.

When the both-side printing is requested, the switching claw 115 swings to assume the position as depicted in the broken line. Consequently, the recording sheet S having a toner image fixed on the surface thereof is transported toward the pair of sheet ejection reversing rollers 120 by the preliminary sheet ejection rollers 116. The switching claw 119 which swings about the fulcrum is pushed down, by the recording sheet S, to assume the position depicted in the solid line.

After the recording sheet S has passed, the switching claw 119 swings due to the dead weight to assume the position depicted in the broken line again, and the pair of sheet ejection reversing rollers 120 stops temporarily with the recording sheet S held therebetween. Hereinafter, the position of the recording sheet stopped as described above is referred to as a "both-side switchback point 121".

Subsequently, the pair of sheet ejection reversing rollers 120 reversely rotates to transport the recording sheet S over the switching claw 119 assuming the position as depicted in the broken line. The recording sheet S is transported, by pairs of ADU (Automatic Duplex Unit) transporting rollers 122 to 125, to the pair of timing rollers 112. Subsequently, the recording sheet S is treated in the same manner as in the case of the single-side printing, and is ejected onto the sheet ejection tray 118 after having a toner image fixed on the other surface thereof.

In addition, an ADU transport sensor 126 is disposed along the transport path on which the recording sheet S is transported from the pair of transport rollers 124 to the pair of transport rollers 125. The ADU transport sensor 126 detects the leading edge and the trailing edge of the recording sheet S. For example, an optical sensor of a reflective type or a transmissive type, or other type of sensor such as a mechanical sensor may be used as the ADU transport sensor 126.

The controller 100 refers to the detection signal from the ADU transport sensor 126. When determining that the recording sheet S has reached the pair of transport rollers 125 based on the detection by the ADU transport sensor 126, the controller 100 may stops the pair of transport rollers 124. Hereinafter, the position at which the recording sheet S is stopped under the above-described control is referred to as a "sheet re-feeding waiting point" 127.

In order to perform both-side printing on a plurality of recording sheets S consecutively fed, each of the sheets is transported two times for alternately transferring images to the front side and the rear side of the sheet viewed from the secondary transfer roller 106.

(1-2) Structure of Controller 100

The following describes the structure of the controller 100.

Figure 2:
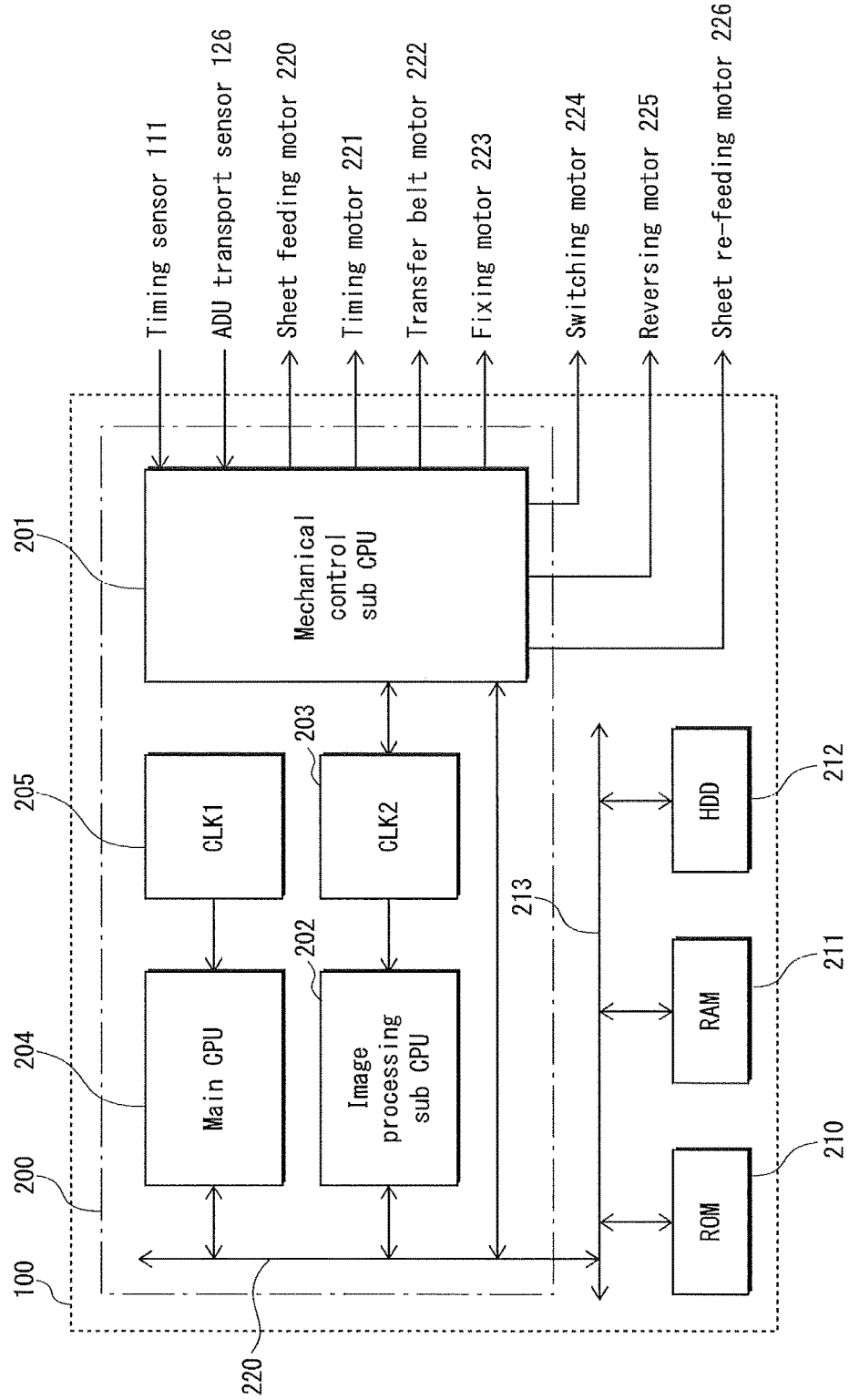
FIG. 2 shows the structure of a controller 100.

As shown in FIG. 2, the controller 100 includes a SoC 200, ROM (Read Only Memory) 210, RAM (Random Access Memory) 211, HDD (Hard Disk Drive) 212, and so on. The SoC 200 is connected to the ROM210, RAM211, and HDD 212 via an internal bus 213. A main CPU 204, image processing sub CPU 202, and mechanical control sub CPU 201 are integrated on the SoC 200.

The main CPU 204, the image processing sub CPU 202, and the mechanical control sub CPU 201 mutually transmit and receive signals, and access the ROM210, the RAM211, and the HDD212 via an internal bus 220.

When the image forming apparatus 1 is powered on, the main CPU 204 reads out and starts a boot program stored in the ROM 210, and, subsequently, starts the image processing sub CPU 202 and the mechanical control sub CPU 201. The main CPU 204 reads out an operating system and application programs from the HDD 212 and executes the operating system and application programs using the RAM 211 as a working storage area. The image processing sub CPU 202 and the mechanical control sub CPU 201 each read out control programs from the ROM 210 and execute the control programs using the RAM 211 as a working storage area.

The mechanical control sub CPU 201 receives detection signals from a timing sensor 111 and an ADU transport sensor 126, and outputs control signals to a sheet feeding motor 220, timing motor 221, transfer belt motor 222, fixing motor 223, switching motor 224, reversing motor 225, and sheet re-feeding motor 226. The sheet feeding motor 220 rotates the pick-up roller 108 and the pair of transport rollers 109 and 110.

The timing motor 221 rotates the pair of timing rollers 112. The transfer belt motor 222 rotationally drives the intermediate transfer belt 103. The fixing motor 223 rotates the fixing roller and the pair of preliminary sheet ejection rollers 116 in the fixing device. The switching motor 224 swings the switching claw 115. The reversing motor 225 rotates the pair of sheet ejection reversing rollers 120. The sheet re-feeding motor 226 rotates the pairs of ADU transport rollers 122 to 125.

The main CPU 204 receives a clock signal from the clock supply circuit 205. The image processing sub CPU 202 and the mechanical control sub CPU 201 both receive a clock signal from the clock supply circuit 203. The main CPU 204, the image processing sub CPU 202, and the mechanical control sub CPU 201 each have a built-in timer and measure time by counting the clock signal from the clock supply circuit 205 or the clock supply circuit 203.

The clock supply circuit 203 changes the frequency of the clock signal thereof in accordance with the control signal from the mechanical control sub CPU 201. In the present embodiment, by way of example, a higher frequency of 512 Hz and a lower frequency of 200 Hz are used. Herein after, switching of the clock frequency of the clock supply circuit 203 from the lower one to the higher one is referred to as "acceleration", and switching from the higher one to the lower one is referred to as "deceleration".

In the case of single-side printing, the mechanical control sub CPU 201 starts counting the number of clocks when the timing motor 221 resumes rotating the pair of timing rollers 112 having being stopped in a state that a recording sheet is in contact therewith. When determining that the recording sheet S has reached a sheet ejection completion point based on the counted number of clocks, the mechanical control sub CPU 201 stops the pair of sheet ejection rollers 117.

In the case of both-side printing, when determining, based on the counted number of clocks, that the recording sheet S has been transported to the both-side switch back point 121 by the pair of sheet ejection reversing rollers 120 holding the recording sheet S between them, the mechanical control sub CPU 201 stops the reversing motor 225.

Subsequently, when the reversing motor 225 starts reverse rotation, the mechanical control sub CPU 201 starts counting the number of clocks. When determining, based on the counted number of clocks, that the recording sheet S has reached a sheet re-feeding waiting point 127, the mechanical control sub CPU 201 stops the sheet re-feeding motor 226. The recording sheet S, after printing on one side thereof is completed, is held at this point until printing on the other side thereof is started.

(1-3) Operations of Controller 100

The following describes operations of the controller 100 in terms of the CPUs.

When receiving a printing job, the main CPU 204 requests the image processing sub CPU 202 to perform image processing for the printing job. The image processing sub CPU 202 performs the image processing with reference to the printing job data stored in the RAM 211, for example.

The printing job data is described in the PDL (Page Description Language). In the present embodiment, it is determined that the load is small when the image relating to the printing job data is constituted by characters only, and determined that the load is large when the image contains objects other than characters (e.g., photographic images). Note that whether the processing load is small or large may be determined using other methods and references.

Figure 3:
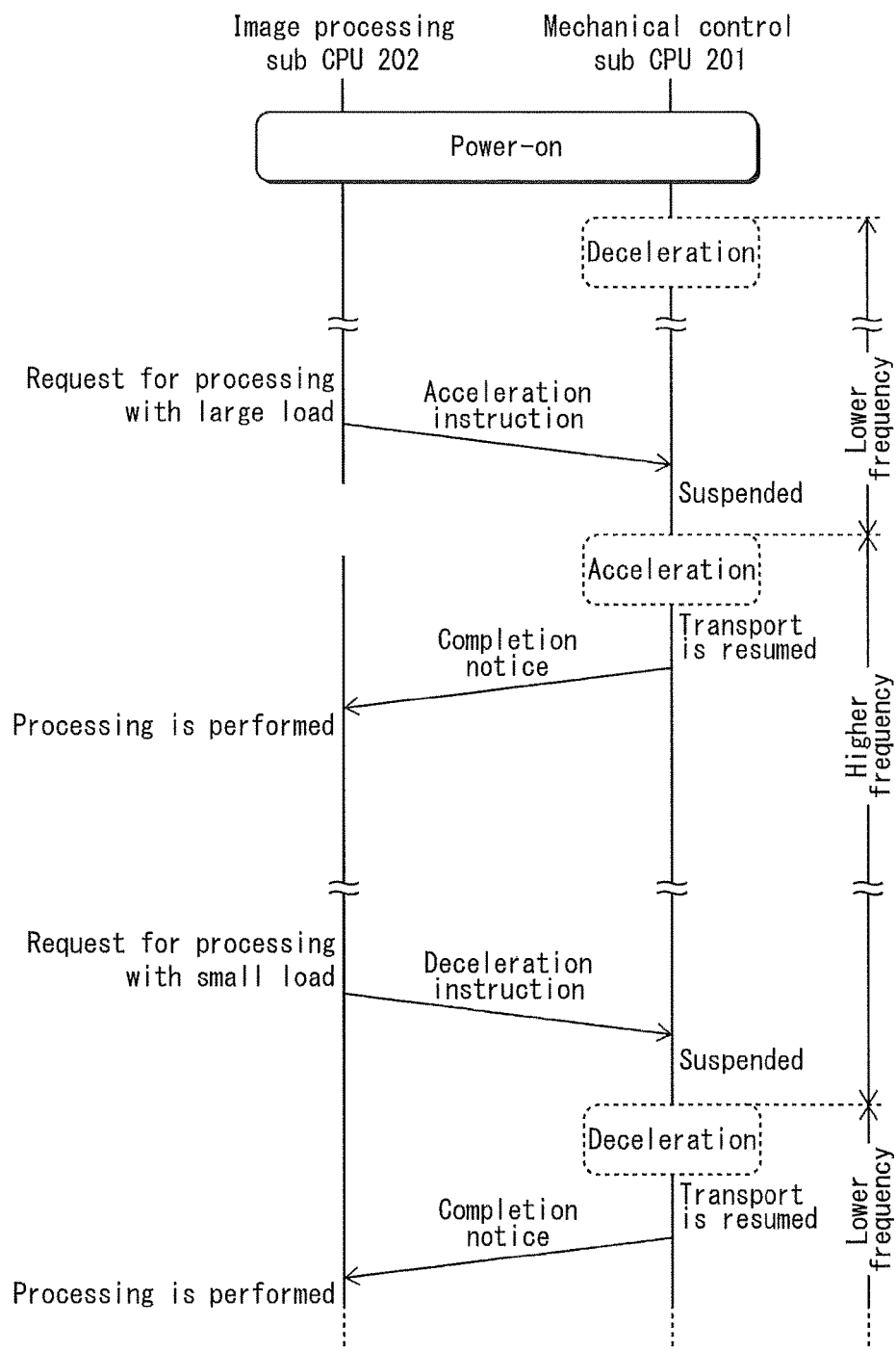
FIG. 3 is a sequence diagram showing a clock frequency switching operation by the controller 100.

FIG. 3 is a sequence diagram showing an example of the control performed when it is determined that the load of the image processing is large. As shown in FIG. 3, immediately after the image forming apparatus 1 is powered on, the mechanical control sub CPU 201 performs initial processing for the deceleration of the clock supply circuit 203.

When receiving a request for image processing with a large load, the image processing sub CPU 202 instructs the mechanical control sub CPU 201 to perform the acceleration. On receiving the instruction, the mechanical control sub CPU 201 suspends the transport of a recording sheet at a suspension point, and performs the acceleration. Subsequently, the mechanical control sub CPU 201 resumes the transport of the recording sheet, and notifies the image processing sub CPU 202 of the completion of the acceleration.

Note that, in the present embodiment, for controlling the sheet transport after the acceleration, clocks are counted until the counted number of clocks reaches a value Ch that is obtained by the formula below:

$$Ch = Cl \times Fh / Fl$$

where Fl denotes the lower clock frequency, Fh denotes the higher clock frequency, and Cl denotes the number of clocks counted while the clock frequency is at the lower clock frequency Fl. Note that Cl and Ch may be both stored in the ROM 210 in advance and used for controlling the sheet transport.

When notified of the completion of the acceleration by the mechanical control sub CPU 201, the image processing sub CPU 202 performs the image processing with a large load. The image processing is performed with reference to the printing job data stored in the RAM 211, for example.

When receiving a request for the image processing with a small processing load, the image processing sub CPU 202 performs the deceleration by performing a procedure similar to that described above.

(1-3-1) Operations of Image Processing Sub CPU 202

The following describes the operations of the image processing sub CPU 202 in more details.

Figure 4:
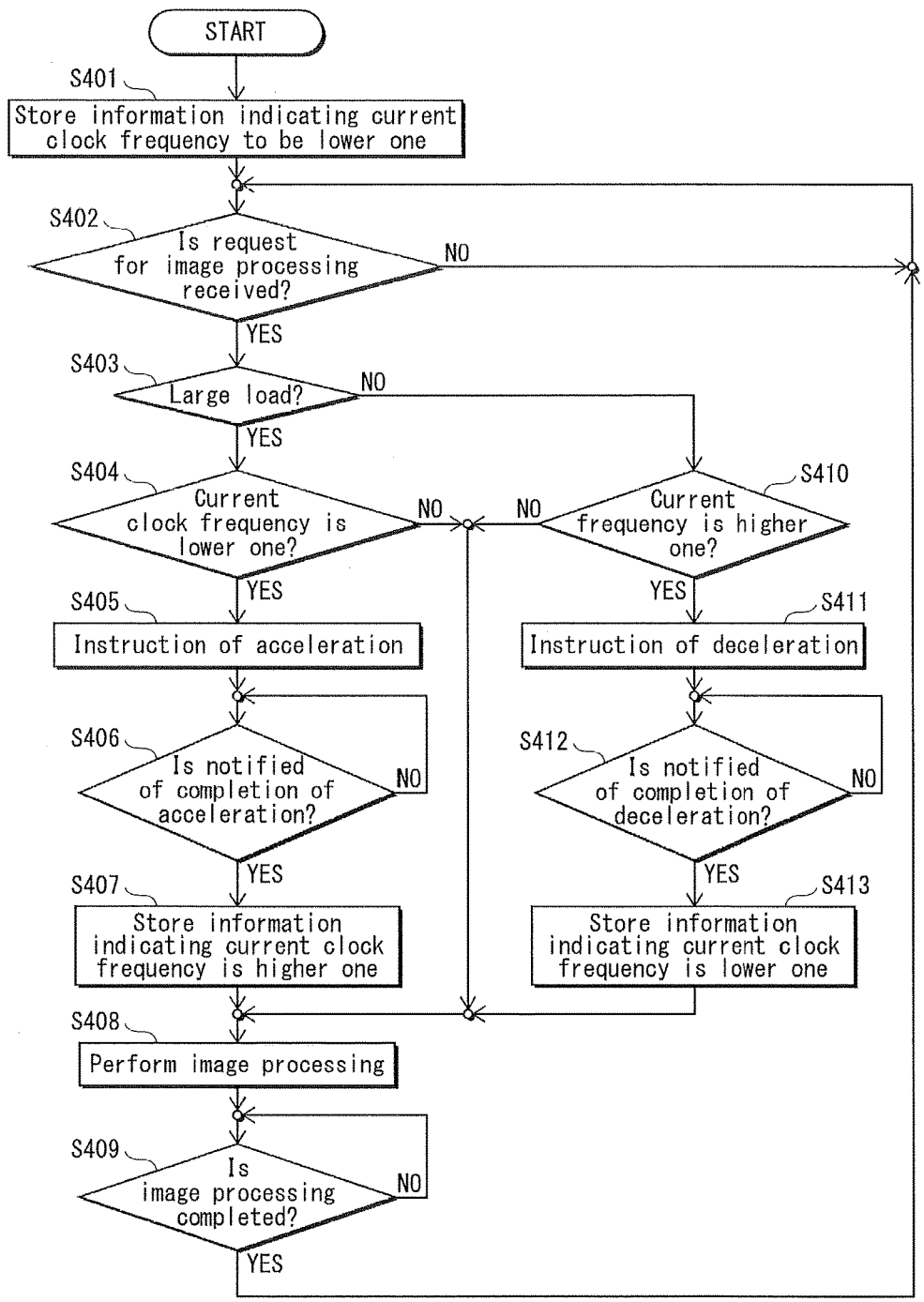
FIG. 4 is a flowchart showing operations of an image processing sub CPU 202.

As shown in FIG. 4, when the image forming apparatus 1 is powered on, the image processing sub CPU 202 initially stores information indicating that current clock frequency is the lower one (S401).

Subsequently, when receiving a request for the image processing from the main CPU 204 (Step S402: YES), the image processing sub CPU 202 determines whether the processing load of the image processing is large or small. Here, by analyzing the printing job data described in the PDL (Page Description Language), the image processing sub CPU 202 determines that the processing load is small when the image relating to the printing job data includes characters only, and determines that the processing load is large when the image includes photographic images or objects other than characters. Note that other methods or references may be used for determining whether the processing load is small or large.

When it is determined that the load of the image processing is large (Step S403: YES) and when the current clock frequency is the lower one (Step S404: YES), the image processing sub CPU 202 instructs the mechanical control sub CPU 201 to accelerate the clock supply circuit 203 (Step S405). Subsequently, when notified of the completion of the acceleration by the mechanical control sub CPU 201 in response to the instruction (Step S406: YES), the image processing sub CPU 202 stores information indicating that current clock frequency is the higher one (Step S407).

When it is determined that the load of the image processing is small (Step S403: NO) and the current frequency is the higher one (Step S410: YES), the image processing sub CPU 202 instructs the mechanical control sub CPU 201 to decelerate the clock supply circuit 203 (Step S411). Subsequently, when notified of the completion of the deceleration by the mechanical control sub CPU 201 in response to the instruction (Step S412: YES), the image processing sub CPU 202 stores information indicating that current clock frequency is a lower one (Step S413).

In the case that it is determined that the load of the image processing is large (Step S403: YES) and the current clock frequency is the higher one (Step S404: NO), or in the case that it is determined that the load of the image processing is small (Step S403: NO) and the current clock frequency is the lower one (Step S410: NO), or after the completion of Step S407 or S413, the image processing sub CPU 202 performs the image processing (Step S408).

Specifically, the image processing is processing for referring to the printing job data described in PDL and expanding the data included therein into bitmap data. Subsequently, after completion of the image processing (Step S409: YES), the above-described steps from Step S402 are repeated.

As described above, the clock frequency is changed by the mechanical control sub CPU 201. Accordingly, malfunction due to the change of the clock frequency is prevented during the mechanical control.

Note that, when the load of the image processing is small, it is unlikely that the convenience of the user damaged by the increase in the processing time, even without the acceleration of the clock frequency. Power consumption can be suppressed by performing the processing with a small load without instructing the clock supply circuit 203 to perform acceleration.

(1-3-2) Operations of Mechanical Control Sub CPU 201

The following describes the operations of the mechanical control sub CPU 201.

Figure 5:
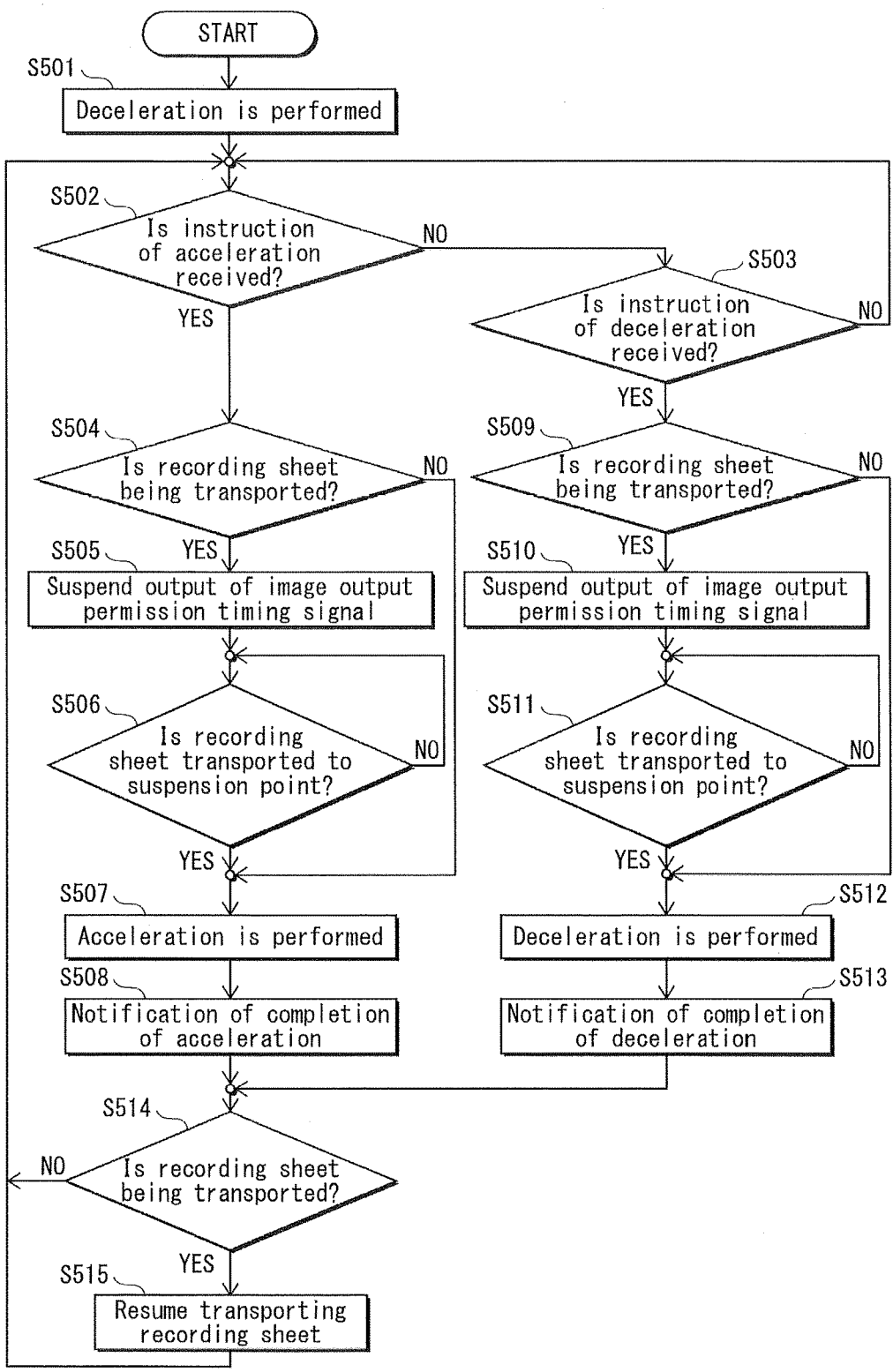
FIG. 5 is a flowchart showing operations of a mechanical control sub CPU 201.

As shown in FIG. 5, at the start of the operations (i.e., when the image forming apparatus 1 is powered on), the mechanical control sub CPU 201 decelerates the clock supply circuit 203 (S501). Accordingly, unnecessary increase in the power consumption is suppressed.

When receiving an instruction of acceleration from the image processing sub CPU 202 (S502: YES), the mechanical control sub CPU 201 determines whether or not any recording sheet is being transported. When determined affirmatively (S504: YES), the mechanical control sub CPU 201 suspends the output of an image output permission timing signal (S505). When determined negatively (S504: NO), Step S507 is performed next.

The image output permission is a signal used for achieving vertical synchronization between the transport positions of recording sheets, and is also referred to as the TOD (Top of Document). While the output of the image output timing signal is suspended, sheet feeding from the sheet feeding cassette 107 is suspended.

In this case, if there is any recording sheet that has already left the sheet feeding cassette 107 and has not been ejected from the apparatus yet, the recording sheet continues to be transported until any one of suspension points. The suspension points include the above-mentioned ejection completion point, the both-side switchback point 121, the sheet re-feeding waiting point 127, and a transfer waiting point. The transfer waiting point indicates the position where a recording sheet picked up from the sheet feeding cassette 107 comes into contact with the pair of timing rollers 112 and is stopped there.

Needless to say, a plurality of recording sheets may be stopped at the ejection completion point. However, at other suspension points, only one recording sheet is allowed to be stopped in order to prevent sheet jamming.

When all recording sheets have been transported to the suspension points (S506: YES), the mechanical control sub CPU 201 performs the acceleration (S507), and, subsequently, notifies the image processing sub CPU 202 of the completion of the acceleration (S508).

When receiving the instruction of deceleration from the image processing sub CPU (Step S503: YES) instead of that of acceleration (Step S502: NO), the mechanical control sub CPU 201 performs the same initial operations as those performed when receiving the instruction of acceleration. That is, when a recording sheet is being transported (Step S509: YES), the mechanical control sub CPU 201 suspends the output of the image output permission timing signal (Step S510), and, when no recording sheet is being transported (Step S509: NO), Step S512 is performed next.

After all the recording sheets have reached the suspension points (Step S511: YES), the mechanical control sub CPU 201 performs the deceleration (S512), and, subsequently, transmits the notification of the completion of the deceleration (S513).

After the completion of Step S508 or Step S513, if any recording sheet is being transported (Step S514: YES), the mechanical control sub CPU 201 resumes the transport of the recording sheet (Step S515). In the case that no recording sheet is being transported (Step S514: NO), or after the transport of the recording sheet is resumed, the above-described steps from Step S502 are repeated.

Needless to say, the mechanical control sub CPU 201 makes adjustments required to keep the transport speed and transport timing of the recording sheet to be the same before and after the change of the clock frequency. The adjustments can be made, for example, by correcting the counted number of clocks as described above.

In order to control the transport position of a recording sheet, the transport distance of the recording sheet is calculated based on the number of clocks counted after the recording sheet has left a suspension point. Therefore, if the clock frequency is changed while the recording sheet is being transported, the transport distance cannot be calculated correctly. In the present embodiment, all the recording sheets being transported along the transport path are stopped at the suspension points before the clock frequency is changed, and the transport of the recording sheets is resumed after the clock frequency has been changed. Accordingly, the transport distance is calculated correctly.

(2) EMBODIMENT 2

The following describes Embodiment 2 of the present invention. The image forming apparatus pertaining to the present embodiment has a nearly the same structure as the image forming apparatus pertaining to Embodiment 1. However, the image forming apparatus pertaining to the present embodiment is particularly characterized by the method of controlling the clock frequency during an image stabilization process. Description is omitted for the components in common with the Embodiment 1. The following description focuses on the characteristic components of the present embodiment. Note that the components in common with Embodiment 1 are designated by the same reference characters.

Figure 6:
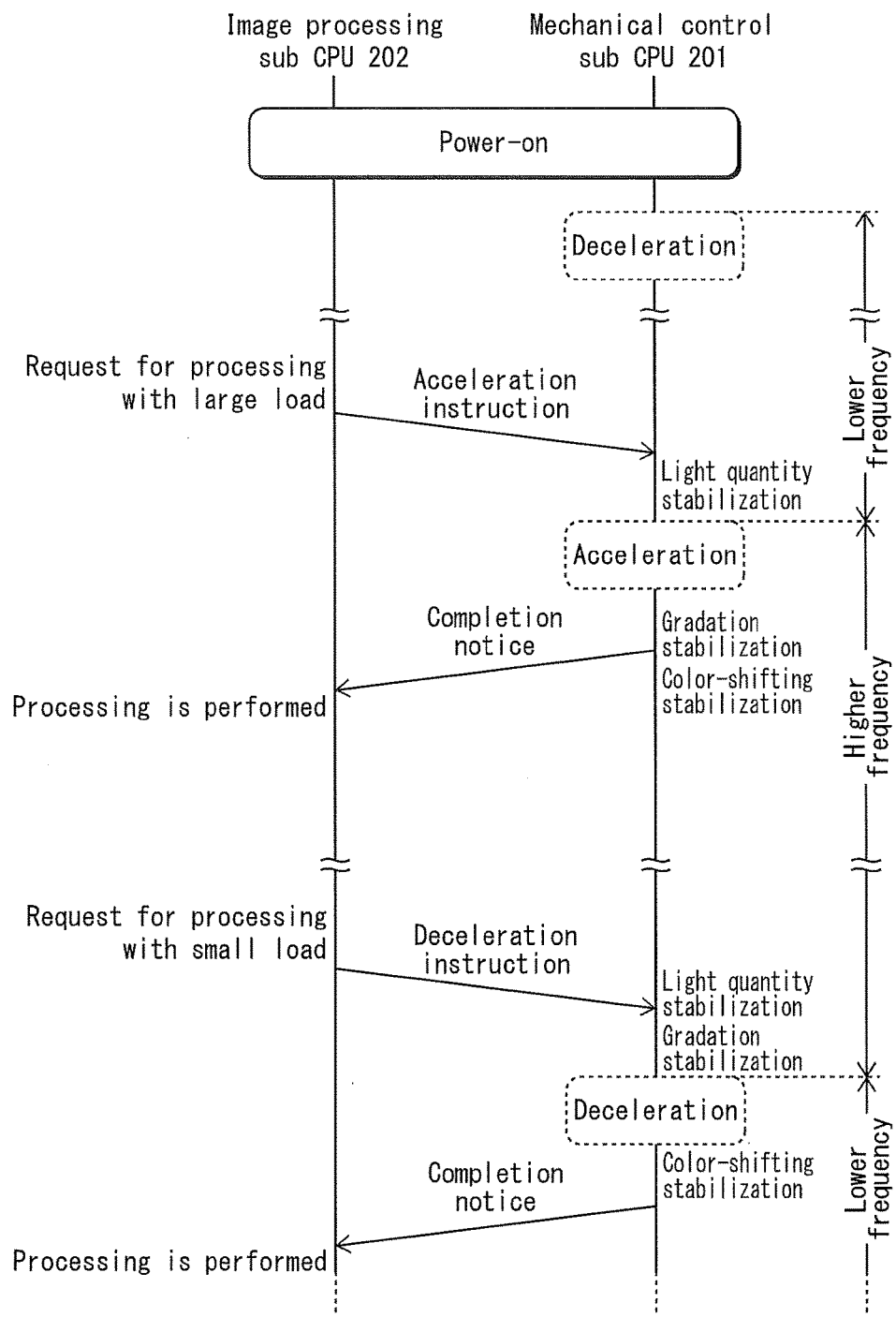
FIG. 6 is a sequence diagram showing a clock frequency switching operation by the controller 100 according to Embodiment 2 of the present invention.

The mechanical control sub CPU 201 pertaining to the present embodiment controls the image stabilization process according to instructions from the image processing sub CPU 202, as shown in FIG. 6. In the present embodiment, the image stabilization process includes a light quantity stabilization process, a gradation stabilization process, and a color-shifting stabilization process, which are performed in this order (hereinafter, these three processes are referred to as "stabilization sub-processes").

When receiving an instruction of acceleration of the clock frequency from the mechanical control sub CPU 201 during, for example, the light quantity stabilization included in the image stabilization process, the mechanical control sub CPU 201 performs the acceleration after the completion of the light quantity stabilization and before the start of the gradation stabilization to be performed next. After completing the acceleration, the mechanical control sub CPU 201 notifies the image processing sub CPU 202 of the completion of the acceleration, and performs the gradation stabilization process and the color-shifting stabilization process that have not been done yet.

When notified of the completion of the acceleration, the image processing sub CPU 202 performs the image processing with a large load.

When receiving an instruction of deceleration during, for example, the gradation stabilization process, the mechanical control sub CPU 201 performs the deceleration of the clock frequency after the completion of the gradation stabilization process and before the start of the color-shifting stabilization process. After the completion of the deceleration, the mechanical control sub CPU 201 notifies the image processing sub CPU 202 of the completion of the deceleration, and performs the color-shifting stabilization process.

Note that the image stabilization process is performed using toner patches. The toner patches are primarily transferred to the intermediate transfer belt 103. The image forming position, the image forming density, and so on are determined with reference to the toner patches. During the image stabilization process for example, the mechanical control sub CPU 201 starts counting clocks after the toner patches have been primarily transferred to the intermediate transfer belt 103. When the counted number of the clocks reaches a predetermined value, the mechanical control sub CPU 201 reads the toner patches.

The following describes the operations of the mechanical control sub CPU 201 in further details.

Figure 7:
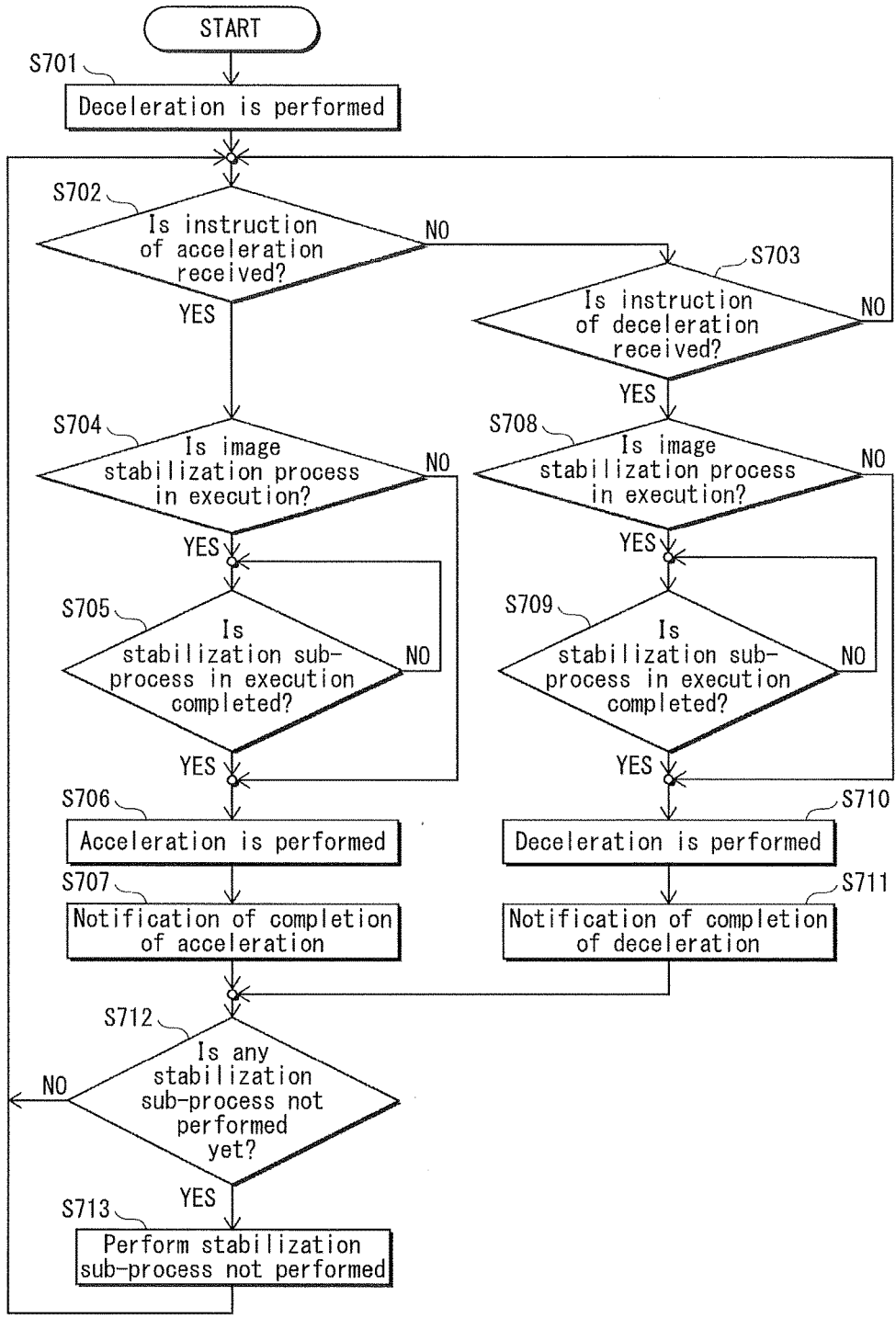
FIG. 7 is a flowchart showing operations of the mechanical control sub CPU 201.

As shown in FIG. 7, the mechanical control sub CPU 201 in the present embodiment operates in the nearly same manner as in Embodiment 1. The following describes the differences therebetween. When receiving an instruction of acceleration of the clock frequency from the image processing sub CPU 202 (Step S702: YES), if the image stabilization process is in execution (Step S704: YES), the mechanical control sub CPU 201 continues a stabilization sub-process in execution.

After the completion of the stabilization sub-process (S705: YES), the mechanical control sub CPU 201 performs the acceleration (S706) in response to the instruction from the image processing sub CPU 202, and notifies the image processing sub CPU 202 of the completion of the acceleration (S707).

When receiving an instruction of deceleration of the clock frequency from the image processing sub CPU 202 (Step S703: YES), the mechanical control sub CPU 201 performs the deceleration (Step S710) after performing the same operations performed for the acceleration as described above (Step S708 and Step S709), and notifies the image processing sub CPU 202 of the completion of the deceleration (Step S711).

Subsequent to Step S707 or Step S711, when there is any stabilization sub-process not performed yet (Step S712: YES), the mechanical control sub CPU 201 performs the stabilization sub-process (Step S713). After the completion of the stabilization sub-process, or when there is no stabilization sub-process not performed yet (Step S712: NO), the above-described steps from Step S702 are repeated.

Needless to say, the counted number of clocks is adjusted also in the image stabilization process in accordance with the clock frequency in the same manner as in the sheet transport control.

The image stabilization process includes a process performed according to the counted number of clocks, such as a position control for forming resist patterns at predetermined positions on the intermediate transfer belt 103. Accordingly, if the clock frequency is changed during the process, the position control is not performed in the intended manner. In contrast, if the switching of the clock frequency is performed after the completion of the stabilization sub-process in execution and before the start of the following stabilization sub-process, as described above, the above-described problem due to the switching of the clock frequency is avoided.

Furthermore, since the switching of the clock frequency is performed earlier than in the case that the switching is performed after the completion of the entire image stabilization process, the waiting period until the image processing sub CPU 202 starts the image processing with a large load is reduced.

(3) EMBODIMENT 3

The following describes Embodiment 3 of the present invention. The image forming apparatus pertaining to the present embodiment has a structure nearly the same as that of the image forming apparatuses pertaining to Embodiments 1 and 2. The present embodiment is characterized by the control of the clock frequency during a cleaning process. Accordingly, description is omitted for the components in common with the above-described Embodiments 1 and 2. The following description mainly focuses on the characteristic components of the present embodiment. Note that, in the following description, the same components as those of Embodiment 1 are designated by the same reference characters.

Figure 8:
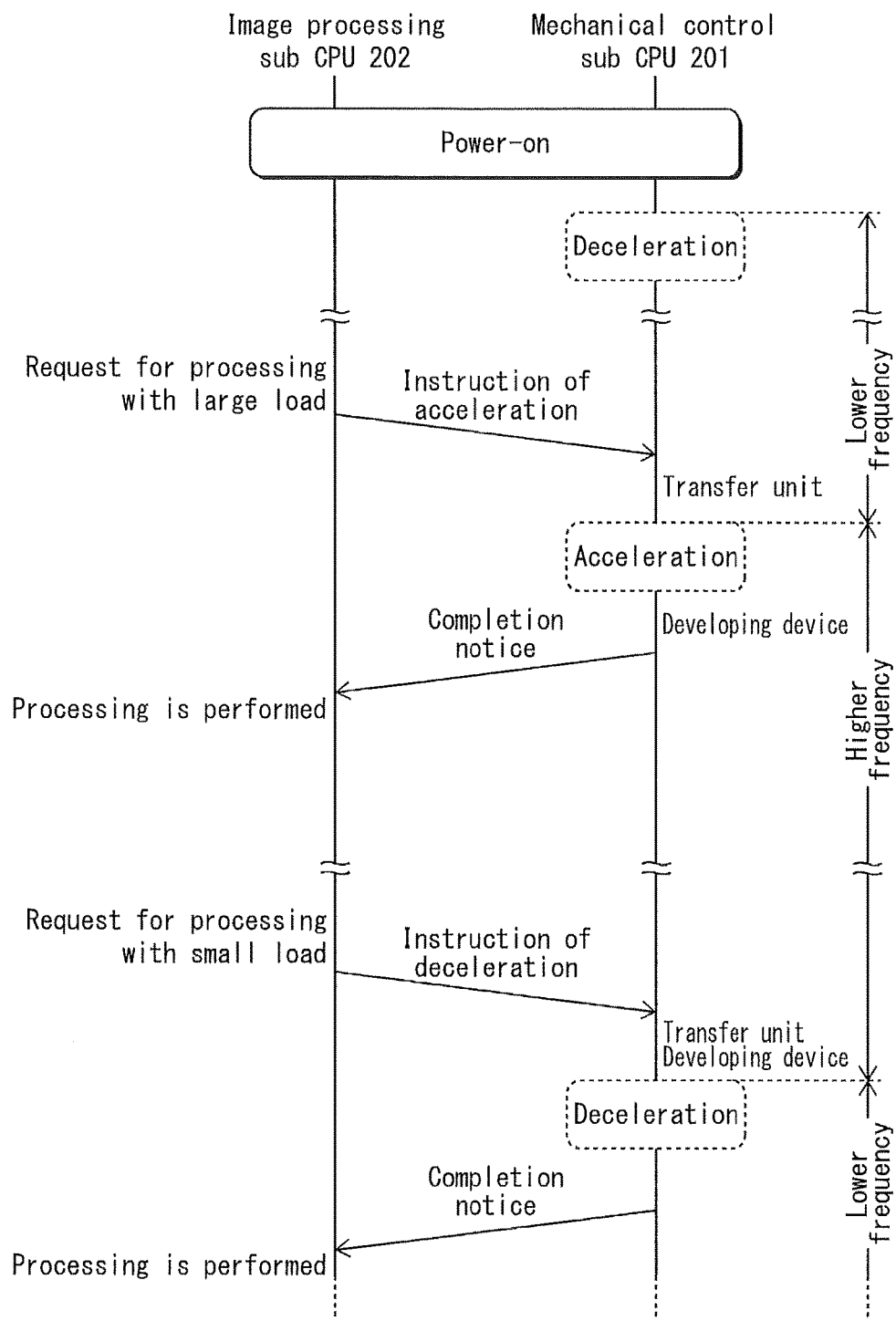
FIG. 8 is a sequence diagram showing a clock frequency switching operation by the controller 100 according to Embodiment 3 of the present invention.

The mechanical control sub CPU 201 pertaining to the present embodiment controls a process of cleaning the inside of the apparatus in accordance with instructions from the image processing sub CPU 202, as is exemplified in FIG. 8. The process of cleaning performed in the present embodiment includes two "cleaning sub-processes" (i.e., a "transfer unit cleaning process" for cleaning the intermediate transfer belt 103, and an "image forming unit cleaning process" for cleaning the photosensitive drums included in the image forming unit 103Y to 103K, which are performed in this order).

When receiving an instruction of acceleration of the clock frequency during, for example, the transfer unit cleaning process, the mechanical control sub CPU 201 performs the acceleration after the completion of the transfer unit cleaning process and before the start of the subsequent image forming unit cleaning process. After the completion of the acceleration, the mechanical control sub CPU 201 notifies the image processing sub CPU 202 of the completion, and, simultaneously, starts the image forming unit cleaning process.

When receiving an instruction of deceleration of the clock frequency during, for example, the image forming unit cleaning process, the mechanical control sub CPU 201 completes the image forming unit cleaning process and, subsequently, performs the deceleration. After the completion of the deceleration, the mechanical control sub CPU 201 notifies the image processing sub CPU 202 of the completion of the deceleration.

On receiving the notification of the completion, the image processing sub CPU 202 performs the image processing.

Note that, in the cleaning process during which residual toner is scraped by a cleaning blade, the cleaning blade may be worn out or damaged due to friction between the photosensitive drum or intermediate transfer belt and the cleaning blade. Accordingly, during the cleaning process, toner is supplied by each of the developing devices included in the image forming units 101Y to 101K for the purpose that the cleaning blade travels over the unit to be cleaned with increased smoothness. The mechanical control sub CPU 201 counts clocks in order to adjust the amount of the toner to be supplied for this purpose.

The following describes the operations of the mechanical control sub CPU 201 in a further detail.

Figure 9:
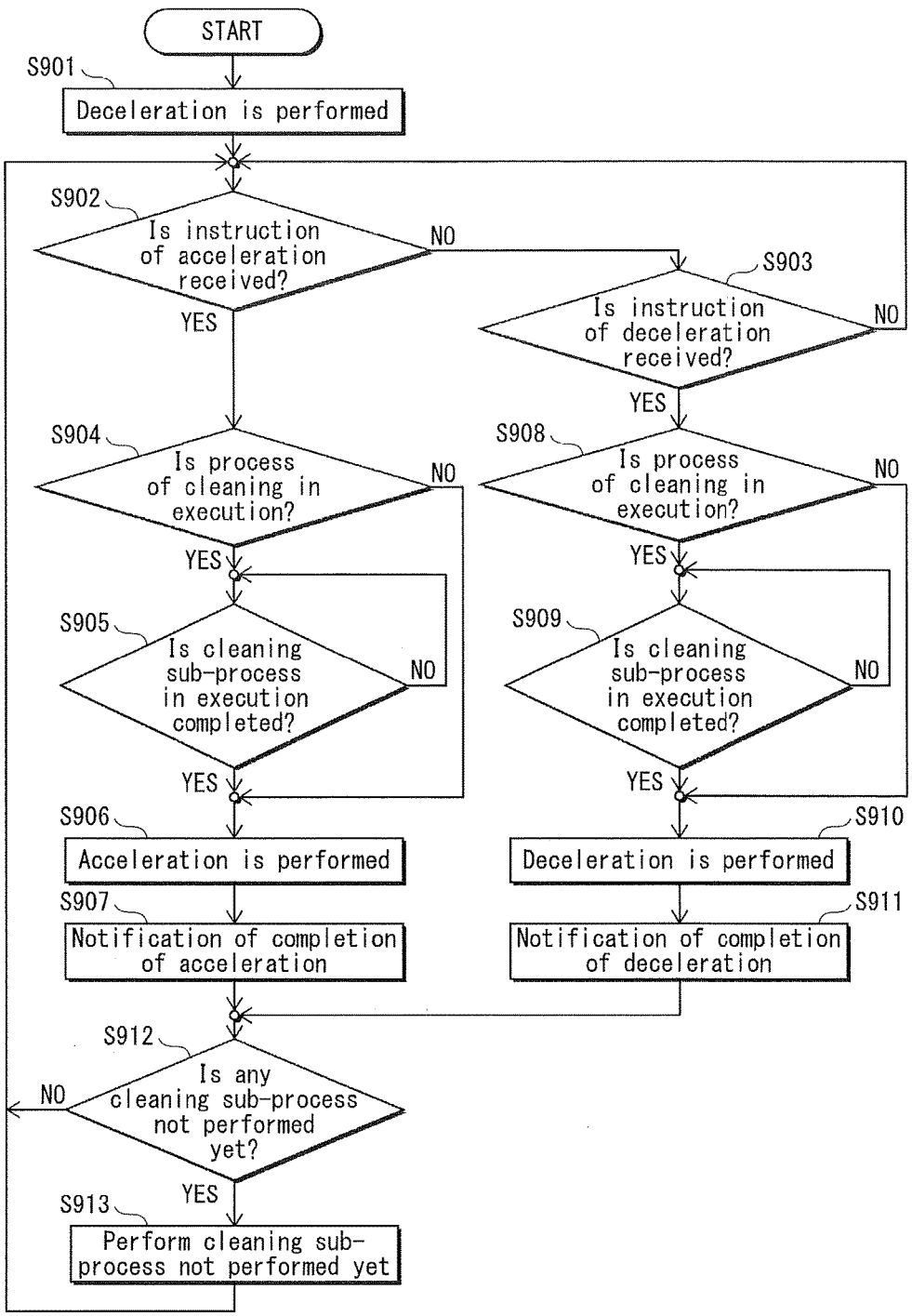
FIG. 9 is a flowchart showing operations of the mechanical control sub CPU 201.

As shown in FIG. 9, the mechanical control sub CPU 201 operates as follows. When receiving an instruction of switching of the clock frequency from the image processing sub CPU 202 (Step S902: YES or Step S903: YES) while any cleaning sub-process is in execution (Step S904: YES or Step S908: YES), the mechanical control sub CPU 201 continues the cleaning sub-process in execution. After the completion of the cleaning sub-process (Step S905: YES or Step S909: YES), or when no cleaning sub-process is in execution (Step S904: NO or Step S908: NO), the mechanical control sub CPU 201 performs the acceleration or deceleration (Step S906 or Step S910), and, subsequently, notifies the image processing sub CPU 202 of the completion of the acceleration or deceleration (Step S907 or Step S911).

If any cleaning sub-process is not performed yet after the notification to the image processing sub CPU 202 (Step S912: YES), the mechanical control sub CPU 201 performs the cleaning sub-process not performed yet (Step S913). After the completion of Step S913, or when there is no cleaning sub-process not performed yet (Step S912: NO), the above-described steps from Step S902 are repeated.

In a structure that a cleaning blade is used for cleaning, toner is supplied from developing device as lubricant for protecting the cleaning blade from wear or damages. The amount of the lubricant (i.e., toner) to be supplied is adjusted by controlling the rotation amount of the photosensitive drum during the process of cleaning. The control of the rotation amount is also based on the counted number of clocks. Needless to say, the counted number is adjusted depending on whether the clock frequency is the higher one or the lower one.

Therefore, if the clock frequency is changed during the process of cleaning, the amount of the lubricant to be supplied cannot be adjusted properly. In the case that the amount is too small, the cleaning blade may be worn out or damaged. In the case that the amount is too large, the sheet may be stained by the toner. In the present embodiment, since the switching of the clock frequency is performed after the completion of a cleaning sub-process, the above-mentioned problem due to the error in the counted number of clocks is avoided.

Furthermore, since the switching of the clock frequency is performed earlier than in the case that the switching of the clock frequency is performed after completion of the entire cleaning process, the waiting period until the image processing sub CPU 202 starts the image processing with a large load is reduced.

(4) MODIFICATIONS

In the above, the description has been provided on the present invention based on specific embodiments thereof. However, the present invention should not be limited to such embodiments. For example, the following modifications may be applied.

(4-1) In the above-described embodiments, whenever the image processing sub CPU 202 transmits an instruction of switching of the clock frequency, the mechanical control sub CPU 201 changes the clock frequency. However, it is needless to say that the present invention is not limited thereto. The following alternative is also possible.

Figure 10:
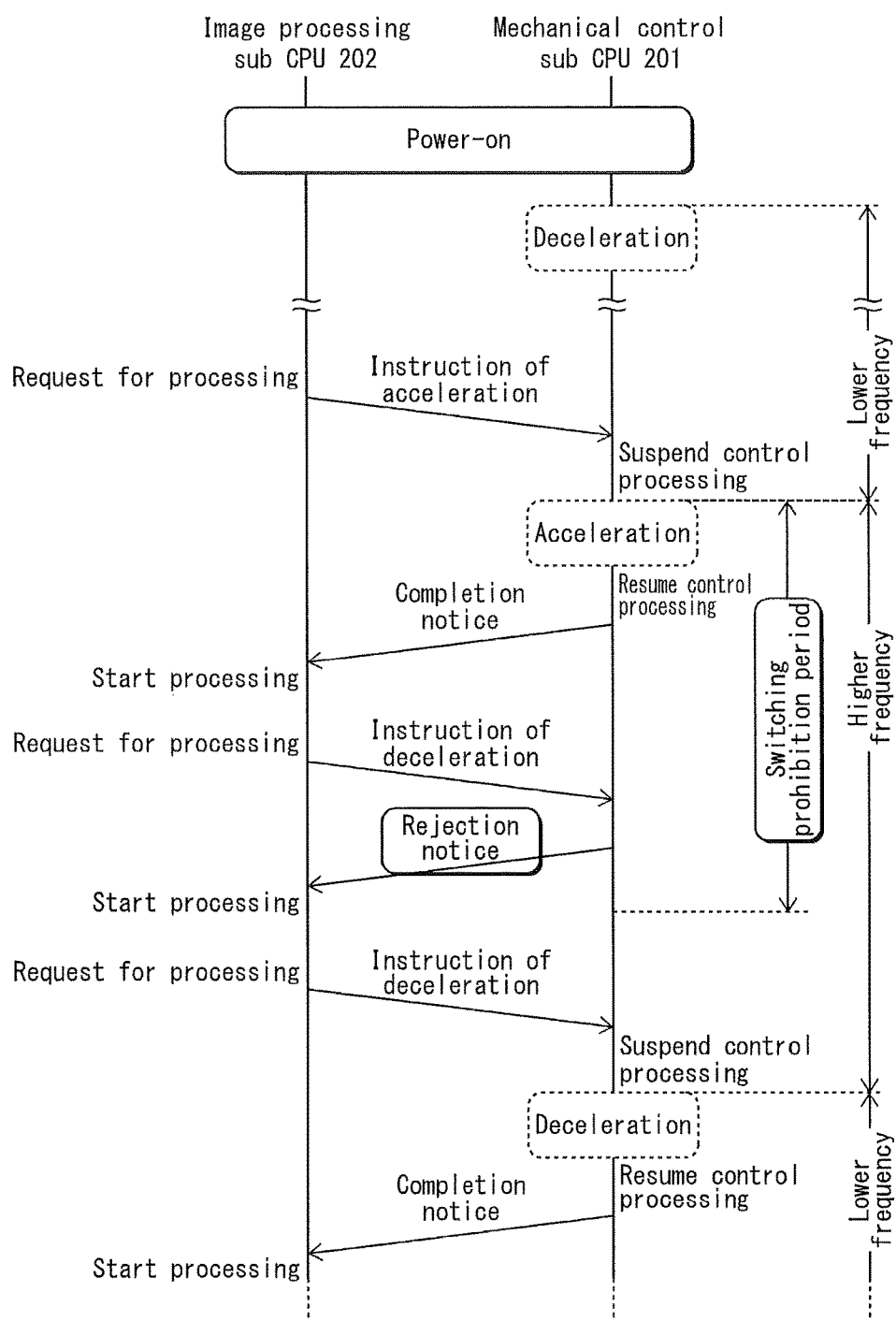
FIG. 10 is a sequence diagram showing a clock frequency switching operation by the controller 100 according to a modification of the present invention.

As shown in FIG. 10, the mechanical control sub CPU 201 may prohibit the switching of the clock frequency for a predetermined period after the switching of the clock frequency has been previously performed in response to an instruction of switching from the image processing sub CPU 202. Hereinafter, the predetermined period is referred to as a "switching prohibition period".

When receiving an instruction of switching from the image processing sub CPU 202 during the switching prohibition period, the mechanical control sub CPU 201 immediately transmits a rejection notice to the image processing sub CPU 202 without performing the switching. On receiving the rejection notice in response to the instruction of switching, the image processing sub CPU 202 starts the image processing.

When receiving an instruction of switching from the image processing sub CPU 202 after the switching prohibition period expires, the mechanical control sub CPU 201 changes the clock frequency while the mechanical control is suspended, as in the above-described Embodiments. After the completion of the switching of the clock frequency, the mechanical control sub CPU 201 resumes the mechanical control, and notifies the image processing sub CPU 202 of the completion of the switching of the clock frequency. On receiving the notification of the completion of the switching, the image processing sub CPU 202 starts the image processing.

Figure 11:
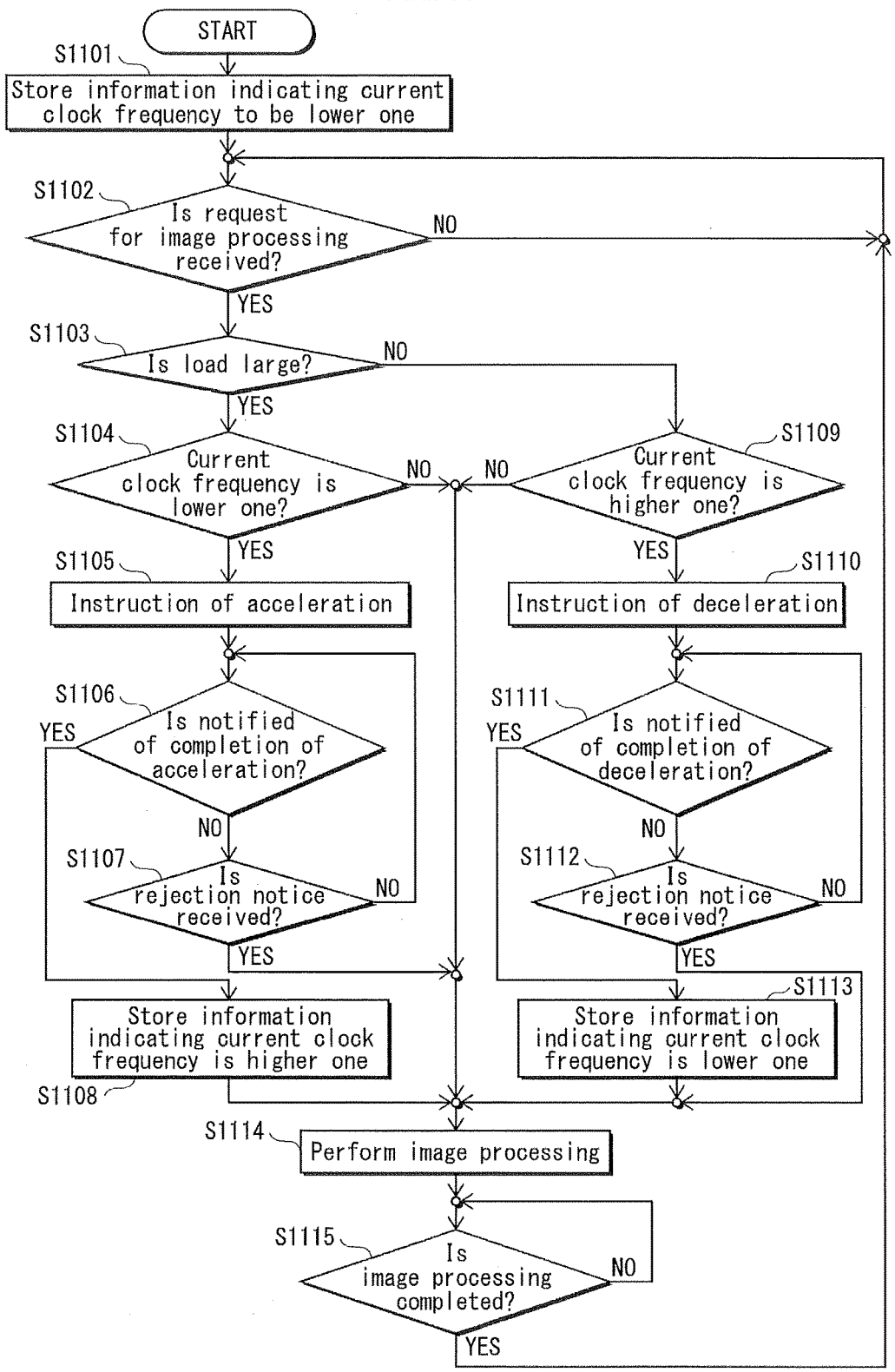
FIG. 11 is a flowchart showing operations of an image processing sub CPU 202.

FIG. 11 is a flowchart showing the operations of the image processing sub CPU 202 in the present modification. As shown in FIG. 11, when notified of the completion of the switching (Step S1106: YES or Step S1111: YES) in response to an instruction of switching of the clock frequency (Step S1105 or Step S1110), the image processing sub CPU 202 stores the state information of the clock frequency (Step S1108 or Step S1113). After storing the state information, or when receiving the rejection notice (Step S1107: YES or Step S1112: YES), the image processing sub CPU 202 performs the image processing (Step S1114).

Figure 12:
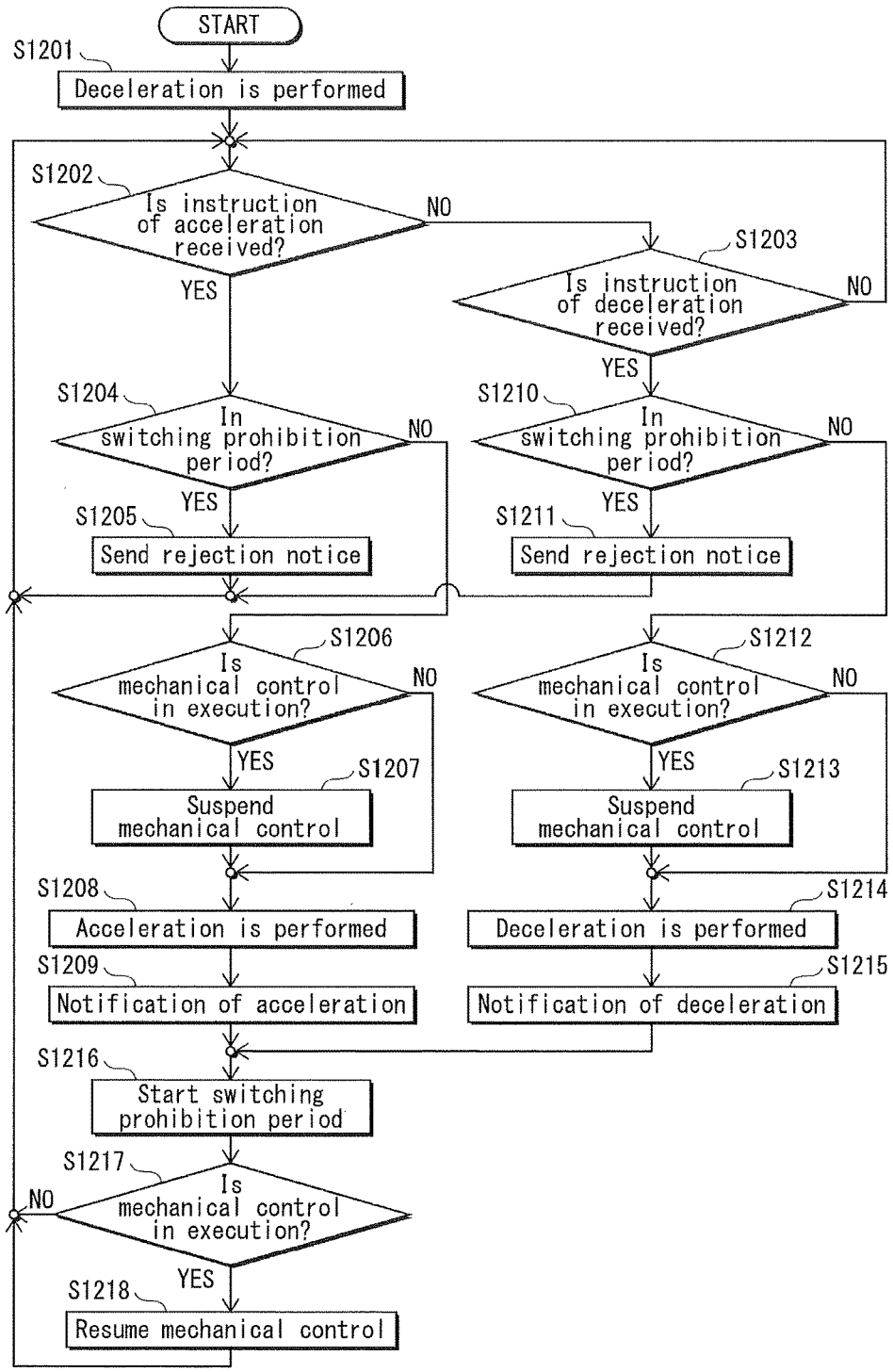
FIG. 12 is a flowchart showing operations of the mechanical control sub CPU 201.

FIG. 12 is a flowchart showing the operations of the mechanical control sub CPU 201 in the present modification. As shown in FIG. 12, when receiving an instruction of switching of the clock frequency from the image processing sub CPU 202 (Step S1202: YES or Step S1203: YES), the mechanical control sub CPU 201 judges whether or not it is in the switching prohibition period. This judgment is made by comparing the elapsed time from the start of the switching prohibition period in Step S1216 with a predetermined threshold.

When it is judged in the switching prohibition period (Step S1204: YES or Step S1210: YES), the mechanical control sub CPU 201 transmits, to the image processing sub CPU 202, a rejection notice in response to the instruction of switching (Step S1205 or S1211). When receiving the instruction of switching outside the switching prohibition period (Step S1204: NO or S1210: NO) or while the mechanical control is in execution (Step S1206: YES or S1212: YES), the mechanical control sub CPU 201 suspends the mechanical control (S1207 or S1213). After the completion of Step S1207 or S1213 or when receiving the instruction of switching while the mechanical control is not in execution (S1206: NO or S1212: NO), the mechanical control sub CPU 201 changes the clock frequency (Step S1208 or S1214), and, subsequently, notifies the image processing sub CPU 202 of the completion of the switching (Step S1209 or Step S1215).

Subsequently, the mechanical control sub CPU 201 starts a switching prohibition period (Step S1216). When the mechanical control is in execution (Step S1217: YES), the mechanical control sub CPU 201 resumes the mechanical control which has been suspended (Step S1218). When the mechanical control is not in execution (Step S1217: NO), or after the completion of Step S1218, the above-described steps from Step S1202 are repeated.

The above-described modification prevents frequent switching of the clock frequency, thereby preventing delay in the process due to frequent interruptions of the mechanical control.

(4-2) The above-described Modification 1 prevents frequent switching of the clock frequency by prohibiting switching of the clock frequency until a predetermined period elapses from the previous switching of the clock frequency. However, it is needless to say that the present invention is not limited thereto. The following alternative is also possible.

Figure 13:
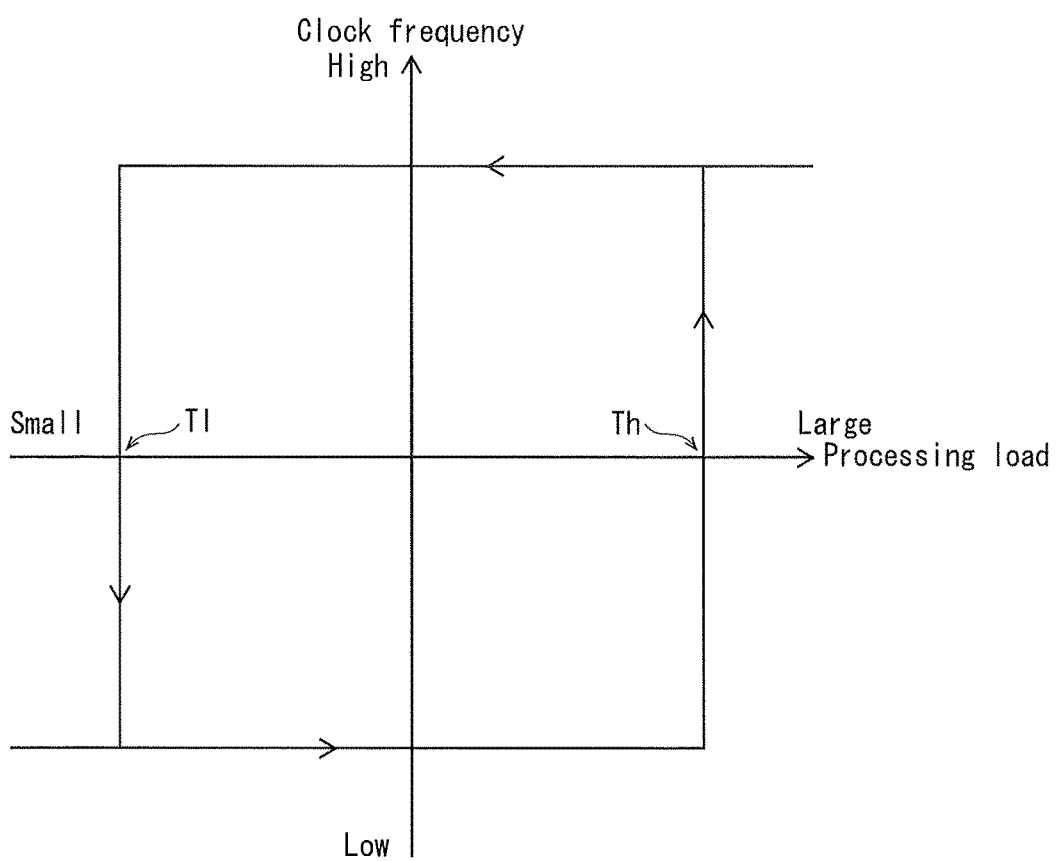
FIG. 13 is a graph showing the hysteresis characteristic between reference values for determining processing load and clock frequency according to another modification of the present invention.

When transmitting an instruction of switching of the clock frequency to the mechanical control sub CPU 201, the image processing sub CPU 202 uses different reference values for determining the level of the processing load between in the case of acceleration and in the case of deceleration. Specifically, when transmitting an instruction of acceleration, the image processing sub CPU 202 refers to a first reference value indicating a larger processing load than a second reference value which the image processing sub CPU 202 refers to when transmitting an instruction of acceleration. FIG. 13 is a graph showing the Hysteresis characteristic between the reference values referred to for determining the level of the processing load and the clock frequency.

As shown in FIG. 13, when the image processing sub CPU 202 in the present modification starts operating, the clock frequency is the lower one. Subsequently, the image processing sub CPU 202 instructs the mechanical control sub CPU 201 to accelerate the clock frequency when the processing load of the image processing requested by the main CPU 204 is larger than a threshold Th. When the image processing sub CPU 202 receives, from the main CPU 204, a request for image processing with a processing load smaller than the threshold T1 while the clock frequency is the higher one, the image processing sub CPU 202 instructs the mechanical control sub CPU 201 to perform the deceleration.

Note that the threshold Th may be determined, for example, based on whether or not the image processing is color image processing. The threshold T1 may be determined, for example, based on whether or not the image processing is monochrome image processing.

Figure 14:
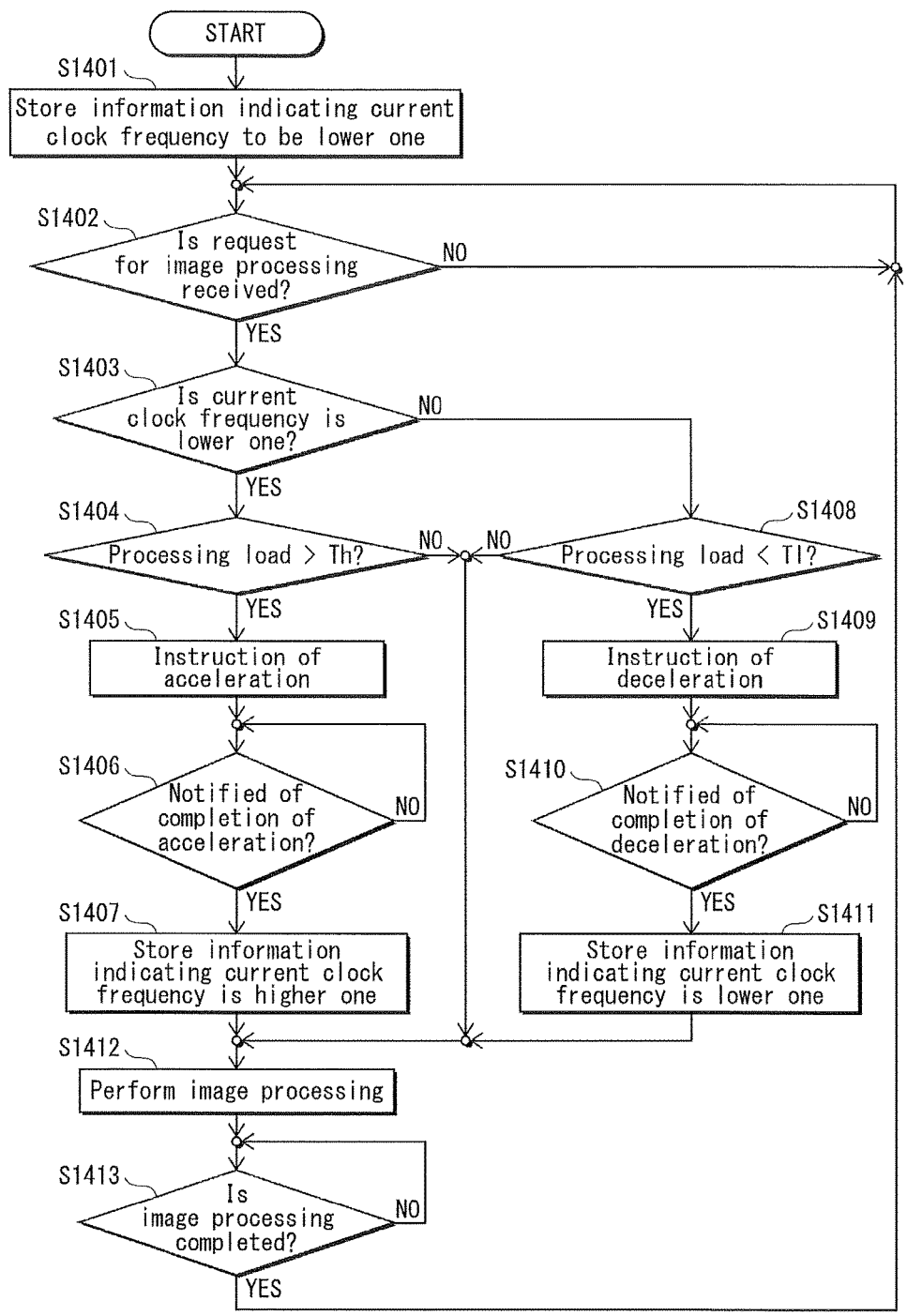
FIG. 14 is a flowchart showing operations of the image processing sub CPU 202.

FIG. 14 is a flowchart showing the operations of the image processing sub CPU 202 in the present modification. As shown in FIG. 14, on receiving a request for image processing from the main CPU 204 (Step S1402: YES), the image processing sub CPU 202 checks the current clock frequency. When the current frequency is the lower one (Step S1403: YES), the image processing sub CPU 202 checks the processing load of the image processing. When the processing load is larger than the threshold Th (Step S1404: YES), the image processing sub CPU 202 instructs the mechanical control sub CPU 201 to accelerate the clock frequency (Step S1405).

When notified of the completion of the acceleration by the mechanical control sub CPU 201 (Step S1406: YES), the image processing sub CPU 202 stores information indicating that current clock frequency is the higher one (Step S1407). When the current frequency is the higher one (Step S1403: NO) and the processing load is smaller than the threshold T1 (Step S1408: YES), the image processing sub CPU 202 instructs the mechanical control sub CPU 201 to perform the deceleration (Step S1409). Subsequently, when notified of the completion of the deceleration by the mechanical control sub CPU 201 (Step S1410: YES), the image processing sub CPU 202 stores information indicating that current clock frequency is the lower one (Step S1411).

After storing the information, the image processing sub CPU 202 performs the image processing (Step S1412). Subsequently, after the completion of the image processing (Step S1413: YES), the above-described steps from Step S1402 are repeated.

The above-described modification also prevents frequent switching of the clock frequency, thereby preventing delay in the process due to frequent interruptions of the mechanical control. In addition, the above-described modification prevents excessive increase in the power consumption and the image processing time by performing the switching of the clock frequency when the processing load of the image processing is particularly small or large.

(4-3) With respect to the above-mentioned embodiments, description has been made with reference to an exemplary case that the suspension points of a recording sheet includes the sheet ejection completion point, the both-side switchback point 121, the sheet re-feeding waiting point 127. However, it is needless to say that the present invention is not limited thereto. The positions and number of the suspension points are not limited to the above-mentioned ones. For example, the position where a sheet comes into contact with and stopped by the pair of timing rollers 112 may be used as a suspension point.

In the above-described Embodiment 2, the stabilization sub-processes includes the light quantity stabilization process, the gradation stabilization process, and the color-shifting stabilization process. However, needless to say, the present invention is not limited to this. The types and the number of the stabilization sub-processes are not limited thereto. By dividing the stabilization process into as many stabilization sub-processes as possible, it is more probable that the delay until the image stabilization process is suspended is reduced, and, accordingly, overhead due to the switching of the clock frequency is also reduced.

In the above-described Embodiment 3, the process of cleaning includes the transfer unit cleaning process and the image forming unit cleaning process as the cleaning sub-processes. However, needless to say, the present invention is not limited thereto. The types and the number of the cleaning sub-processes are not limited thereto. Similarly to the image stabilization process, it is advantageous to divide the device cleaning process into as many cleaning sub-processes as possible, as long as the content thereof is unchanged.

It is preferable that the number of the stabilization sub-processes and that of the cleaning sub-processes are two or more.

(4-4) With respect to the above-mentioned embodiments, description has been made with reference to an exemplary case that the mechanical control sub CPU 201 changes the clock frequency of the clock supply circuit 203. However, needless to say, the present invention is not limited thereto. The image processing sub CPU 202 may perform the switching of the clock frequency instead of the mechanical control sub CPU 201.

In the present modification, as shown in FIG. 15, when the image forming apparatus 1 is powered on, the image processing sub CPU 202 starts operating and initially sets the clock frequency of the clock supply circuit 203 to the lower one.

Subsequently, when receiving a request for image processing with a large load, the image processing sub CPU 202 instructs the mechanical control sub CPU 201 to suspend the control processing currently being performed. On receiving the instruction, the mechanical control sub CPU 201 suspends the control processing, and sends a completion notice to the image processing sub CPU 202, as in the above-described embodiments.

On receiving the completion notice, the image processing sub CPU 202 accelerates the clock supply circuit 203. Subsequently, the image processing sub CPU 202 instructs the mechanical control sub CPU 201 to resume the suspended control processing, and then starts the image processing. On receiving the instruction, the mechanical control sub CPU 201 resumes the suspended control processing. Also in this modification, the mechanical control sub CPU 201 changes the method of measuring time depending on whether the clock frequency is the higher one or the lower one to determine the operation timing properly.

(4-5) With respect to the above-mentioned embodiments, description has been made with reference to the image forming apparatus that is a color printer apparatus of the tandem type and capable of performing both-side printing. However, needless to say, the present invention is not limited thereto. The present invention is also applicable to a color printer apparatus of a type other than the tandem type or a monochrome printer. Furthermore, the present invention achieves the same advantages when applied to an apparatus other than a printer, for example, single-function apparatuses such as a copying apparatus having a document reading function or a facsimile apparatus having a communication function, and a multi-function peripheral (MFP) having a plurality of functions including the above-mentioned ones.

(5) CONCLUSION

As described above, the image forming apparatus according to the embodiments of the present invention is characterized in the image forming apparatus has a system on a chip (SOC) on which a clock supply circuit, a first CPU, and a second CPU are integrated, the clock supply circuit supplying a clock signal while switching a frequency of the clock signal between a first clock frequency and a second clock frequency that is lower than the first clock frequency, the first CPU performing image data processing in synchronization with the clock signal supplied by the clock supply circuit, and the second CPU measuring time with reference to the clock signal supplied by the clock supply circuit and determining, based on the measured time, execution timing of each of a series of processes performed in control processing other than the image data processing, and the image forming apparatus comprises: a load determination unit that determines whether a processing load of the image data processing to be performed by the first CPU is higher than a reference level; and a control unit that controls the clock supply circuit to switch the frequency of the clock signal to the first clock frequency when the load determination unit determines that the processing load is higher than the reference level, and to switch the frequency of the clock signal to the second clock frequency when the load determination unit determines that the processing load is equal to or lower than the reference level, wherein, when the clock supply circuit performs the switching between the first frequency and the second frequency, the second CPU changes a method for measuring time, thereby avoiding variation in the execution timing, and the second CPU completes one process among the series of processes before the switching of the frequency and starts the next one of the series of processes after the switching of the frequency.

According to this structure, clock counting performed for the mechanical control processing and so on is suspended before the switching of the clock frequency, and is resumed after the switching. Consequently, power consumption is saved by performing the switching of the clock frequency in a manner that the clock counting is not negatively affected by the switching.

In the above-described structure, the series of processes may include a series of sheet transport processes for transporting a recording sheet used for image formation along a transport path to a sheet ejection position, one or more positions are predetermined along the transport path, and the series of sheet transport processes include a process for transporting the recording sheet to, and holding the recording sheet at one of the one or more predetermined positions. The one or more predetermined positions may include a position at which the leading edge of the recording sheet comes into contact with a nip formed between a pair of timing rollers that determine timing for transporting the recording sheet to an image transfer position.

Furthermore, the image forming apparatus may further comprise a sheet housing unit that houses recording sheets used for image formation, the sheet transport processes include a process for feeding the recording sheets from the sheet housing unit to the transport path one by one, and the second CPU suspends feeding of a recording sheet before the switching and resumes the feeding after the switching. The position and the transport distance of the recording sheet being transported are controlled based on the counted number of clocks. According to the above-described structure, the control processing of the position and the transport distance of the recording sheet is not negatively affected by the switching of the clock frequency.

In addition, the image forming apparatus may further comprise an image forming unit that forms a toner image and an intermediate transfer belt to which the toner image formed by the image forming unit is primarily transferred and which transports the primarily transferred toner image to a position where the primarily transferred toner image is secondarily transferred to the recording sheet, and the series of processes include an image stabilization process performed by primarily transferring toner patches on predetermined positions on the intermediate transfer belt. In the image stabilization process, based on the counted number of clocks, the transfer positions of the toner patches are controlled, and the detection positions thereof are determined. According to the above-described structure, the image stabilization process is not a negatively affected by the switching of the clock frequency.

In addition, the series of processes may include a cleaning process for cleaning residual toner after completion of image formation. For removing toner remaining on the surface of the photosensitive drum or the intermediate transfer belt using a cleaning blade, the amount of toner supplied for preventing the cleaning blade from being worn out or damaged is adjusted based on the counted number of clocks. According to the above-described structure, the control of the amount of toner to be supplied is not negatively affected by the switching of the clock frequency.

In addition, the image forming apparatus may further comprises a switch prohibiting unit that prohibits the clock supply circuit from switching the frequency until a predetermined period elapses after the previous switching of the frequency. According to this structure, frequent switching of the clock frequency is prevented. Consequently, overhead due to the switching of the clock frequency is also reduced, which enables image formation to be performed smoothly.

In addition, the load determination unit may store therein a first reference value and a second reference value indicating a higher processing load than a processing load indicated by the first reference value, and the load determination unit may refer to the first reference value as the reference level when the current frequency is the first clock frequency, and refers to the second reference value as the reference level when the current frequency is the second clock frequency. According to this structure, frequent switching of the clock frequency is prevented. Consequently, an advantage similar to that described above is obtained.

Preferably, the first CPU starts the image data processing after the switching of the frequency.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

The invention claimed is:

1. An image forming apparatus having a system on a chip (SoC) on which, a clock supply circuit, a first CPU, and a second CPU are integrated, the clock supply circuit supplying a clock signal while switching a frequency of the clock signal between a first clock frequency and a second clock frequency that is lower than the first clock frequency, the first CPU performing image data processing in synchronization with the clock signal supplied by the clock supply circuit, and the second CPU measuring time with reference to the clock signal supplied by the clock supply circuit and determining, based on the measured time, execution timing of each of a series of processes performed in control processing other than the image data processing, the image forming apparatus comprising:

a load determination unit that determines whether image data to be processed by the first CPU meets a predetermined criteria; and a control unit that controls the clock supply circuit to switch the frequency of the clock signal to the first clock frequency when the load determination unit determines that the image data to be processed by the first CPU meets the predetermined criteria, and to switch the frequency of the clock signal to the second clock frequency when the load determination unit determines that the image data to be processed by the first CPU does not meet the predetermined criteria, wherein when the clock supply circuit performs the switching between the first frequency and the second frequency, the second CPU switches a method for measuring time between a first method corresponding to the first clock frequency and a second method corresponding to the second clock frequency, thereby avoiding variation in the execution timing, and the second CPU completes one process among the series of processes before the switching of the frequency and starts the next one of the series of processes after the switching of the frequency.

2. The image forming apparatus according to claim 1, wherein the series of processes include a series of sheet transport processes for transporting a recording sheet used for image formation along a transport path to a sheet ejection position, one or more positions are predetermined along the transport path, and the series of sheet transport processes include a process for transporting the recording sheet to, and holding the recording sheet at one of the one or more predetermined positions.

3. The image forming apparatus according to claim 2, wherein the one or more predetermined positions include a position at which the leading edge of the recording sheet comes into contact with a nip formed between a pair of timing rollers that determine timing for transporting the recording sheet to an image transfer position.

4. The image forming apparatus according to claim 2, further comprising:

a sheet housing unit that houses recording sheets used for image formation, wherein the sheet transport processes include a process for feeding the recording sheets from the sheet housing unit to the transport path one by one, and the second CPU suspends feeding of a recording sheet before the switching and resumes the feeding after the switching.

5. The image forming apparatus according to claim 1, further comprising:

an image forming unit that forms a toner image; and an intermediate transfer belt to which the toner image formed by the image forming unit is primarily transferred and which transports the primarily transferred toner image to a position where the primarily transferred toner image is secondarily transferred to the recording sheet, wherein the series of processes include an image stabilization process performed by primarily transferring toner patches on predetermined positions on the intermediate transfer belt.

6. The image forming apparatus according to claim 1, wherein the series of processes include a cleaning process for cleaning residual toner after completion of image formation.

7. The image forming apparatus according to claim 1, further comprising:

a switch prohibiting unit that prohibits the clock supply circuit from switching the frequency until a predetermined period elapses after the previous switching of the frequency.

8. The image forming apparatus according to claim 1, wherein the load determination unit stores therein a first reference value and a second reference value indicating a higher processing load than a processing load indicated by the first reference value, and the load determination unit refers to the first reference value as the predetermined criteria when the current frequency is the first clock frequency, and refers to the second reference value as the predetermined criteria when the current frequency is the second clock frequency.

9. The image forming apparatus according to claim 1, wherein the first CPU starts the image data processing after the switching of the frequency.

10. The image forming apparatus according to claim 1, wherein the predetermined criteria is met when the image data to be processed by the first CPU includes objects other than characters.

11. The image forming apparatus according to claim 1, wherein when the current frequency is the first clock frequency the load determination unit determines that the predetermined criteria is met when the image data to be processed by the first CPU includes color image processing, when the current frequency is the second clock frequency the load determination unit determines that the predetermined criteria is met when the image data to be processed by the first CPU includes monochrome image processing.

* * * * *